US012450655B2

(12) United States Patent
Negron

(10) Patent No.: US 12,450,655 B2
(45) Date of Patent: Oct. 21, 2025

(54) MODULAR BLOCKCHAIN-IMPLEMENTED COMPONENTS FOR ALGORITHMIC TRADING

(71) Applicant: Tradegen LLC, Austin, TX (US)

(72) Inventor: Xavier Enrique Negron, Austin, TX (US)

(73) Assignee: Tradegen LLC, Austin, TX (US)

( * ) Notice: Subject to any disclaimer, the term of this patent is extended or adjusted under 35 U.S.C. 154(b) by 157 days.

(21) Appl. No.: 18/230,691

(22) Filed: Aug. 7, 2023

(65) Prior Publication Data

US 2024/0046352 A1 Feb. 8, 2024

Related U.S. Application Data

(60) Provisional application No. 63/396,047, filed on Aug. 8, 2022.

(51) Int. Cl.
| | |
|---|---|
| *G06Q 40/00* | (2023.01) |
| *G06Q 20/38* | (2012.01) |
| *G06Q 30/0201* | (2023.01) |
| *G06Q 40/04* | (2012.01) |
| *G06Q 40/06* | (2012.01) |
| *H04L 67/131* | (2022.01) |

(52) U.S. Cl.
CPC .......... *G06Q 40/04* (2013.01); *G06Q 20/389* (2013.01); *G06Q 30/0206* (2013.01); *G06Q 40/06* (2013.01); *H04L 67/131* (2022.05)

(58) Field of Classification Search
CPC ...... G06Q 40/04; G06Q 40/06; G06Q 20/389; G06Q 30/0206; H04L 67/131

USPC .................................................. 705/4, 35–45
See application file for complete search history.

(56) References Cited

U.S. PATENT DOCUMENTS

| | | | |
|---|---|---|---|
| 10,832,529 B2 | 11/2020 | Malek | |
| 10,878,415 B1* | 12/2020 | Yang | .................. G06Q 20/0658 |
| 11,036,614 B1 | 6/2021 | Huang et al. | |
| 2001/0027430 A1 | 10/2001 | Sabourian | |
| 2006/0155638 A1 | 7/2006 | De La Motte | |
| 2015/0095264 A1 | 4/2015 | Williams | |
| 2019/0028276 A1* | 1/2019 | Pierce | .................... G06Q 20/02 |

(Continued)

OTHER PUBLICATIONS

"Yanda Trading Boots", [Online]. Retrieved from the Internet: URL: https: devpost.com software yanda, (Accessed on Aug. 1, 2023), 9 pgs.

(Continued)

*Primary Examiner* — Mike Anderson
*Assistant Examiner* — Mohammed H Mustafa
(74) *Attorney, Agent, or Firm* — SCHWEGMAN LUNDBERG & WOESSNER, P.A.

(57) ABSTRACT

Example methods and systems are directed to providing an algorithmic trading system. One or more self-executing contracts are deployed on a blockchain network to provide at least one indicator and at least one comparator. Each indicator processes external asset data to obtain indicator values. Each comparator processes one or more of the indicator values to obtain output indicating whether a comparator condition is met. A trading bot is generated on the blockchain network to implement predetermined trading rules by using the output of at least one comparator. The trading bot may execute simulated trades according to the predetermined trading rules.

20 Claims, 10 Drawing Sheets

(56) References Cited

U.S. PATENT DOCUMENTS

| | | |
|---|---|---|
| 2019/0311336 A1 | 10/2019 | Kim et al. |
| 2020/0143471 A1* | 5/2020 | Jackson ................. G06Q 40/04 |
| 2020/0184496 A1 | 6/2020 | Medanic |
| 2020/0294143 A1* | 9/2020 | Qiu ........................ G06Q 40/04 |
| 2021/0027369 A1* | 1/2021 | Raheman ............... G06Q 40/04 |
| 2021/0224796 A1 | 7/2021 | Yang et al. |
| 2021/0243039 A1 | 8/2021 | Ding et al. |
| 2022/0188925 A1* | 6/2022 | Blaikie, III ............ G06Q 40/04 |
| 2022/0198562 A1* | 6/2022 | Cella ...................... G06Q 40/04 |
| 2023/0092436 A1* | 3/2023 | Gaur ...................... G06Q 20/06 705/37 |
| 2024/0046293 A1 | 2/2024 | Negron |
| 2024/0046360 A1 | 2/2024 | Negron |

OTHER PUBLICATIONS

"Streak Tech", [Online]. Retrieved from the Internet: URL: https: medium.com streak-ai-tech streak-algo-trade-without-coding-3b16132b155, (Jul. 23, 2018), 6 pgs.

"U.S. Appl. No. 18/230,692, Non Final Office Action mailed Oct. 10, 2024", 19 pgs.

"U.S. Appl. No. 18/230,692, Examiner Interview Summary mailed Dec. 12, 2024", 3 pgs.

U.S. Appl. No. 18/229,563, filed Aug. 2, 2023, Automatic Value Distribution in Decentralized Protocols.

U.S. Appl. No. 18/230,692, filed Aug. 7, 2023, Dynamic Blockchain-Driven Trading Data Feeds.

"U.S. Appl. No. 18/230,692, Examiner Interview Summary mailed Jun. 6, 2025", 3 pgs.

"U.S. Appl. No. 18/230,692, Final Office Action mailed May 5, 2025", 21 pgs.

"U.S. Appl. No. 18/230,692, Response filed Jan. 6, 2025 to Non Final Office Action mailed Oct. 10, 2024", 15 pgs.

"Blockchain", Wikipedia, version of article, [Online] Retrieved from the internet: <www.wikipedia.org>, (Aug. 5, 2021), 29 pgs.

"Ethereum", Wikipedia, version of article, [Online] Retrieved from the internet: <www.wikipedia.org>, (Aug. 7, 2021), 21 pgs.

"Smart contract", Wikipedia, version of article, [Online] Retrieved from the internet: <www.wikipedia.org>, (Aug. 1, 2021), 9 pgs.

* cited by examiner

MODULAR BLOCKCHAIN-IMPLEMENTED COMPONENTS FOR ALGORITHMIC TRADING

CLAIM OF PRIORITY

This application claims the benefit of priority to U.S. Provisional Application Ser. No. 63/396,047, filed on Aug. 8, 2022, which is incorporated herein by reference in its entirety.

TECHNICAL FIELD

Subject matter disclosed herein generally relates to algorithmic trading systems. More specifically, but not exclusively, the subject matter herein includes methods and systems for blockchain-driven algorithmic trading. The subject matter also relates to methods and systems that provide a data feed with performance data based on such blockchain-driven trading.

BACKGROUND

The term "algorithmic trading" generally refers to the use of computer programs and algorithms to automate the execution of trade orders or the management of portfolios and assets. Algorithmic trading systems can continuously monitor market conditions, such as liquidity, volatility, and price changes, and react according to a predetermined trading strategy, without requiring human intervention.

While algorithmic trading systems can create passive sources of income and offer technical advantages, such as more efficient order placement and execution, users of algorithmic trading systems may experience technical problems. For example, a user may need to manually build, code, and/or or test at least certain parts of a trading strategy, requiring time, expertise, and computing resources. In some cases, strategies are not transparent and may thus not execute as expected. Furthermore, a user may need to connect their trading strategy to a trading account, which can result in technical challenges, such as security risks (e.g., unscrupulous entities gaining access to the trading account via Application Programming Interface (API) calls) or code bugs causing unnecessary losses. These and other issues may limit the adoption or scalability of algorithmic trading solutions.

BRIEF DESCRIPTION OF THE DRAWINGS

Some embodiments are illustrated by way of example and not limitation in the figures of the accompanying drawings. In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
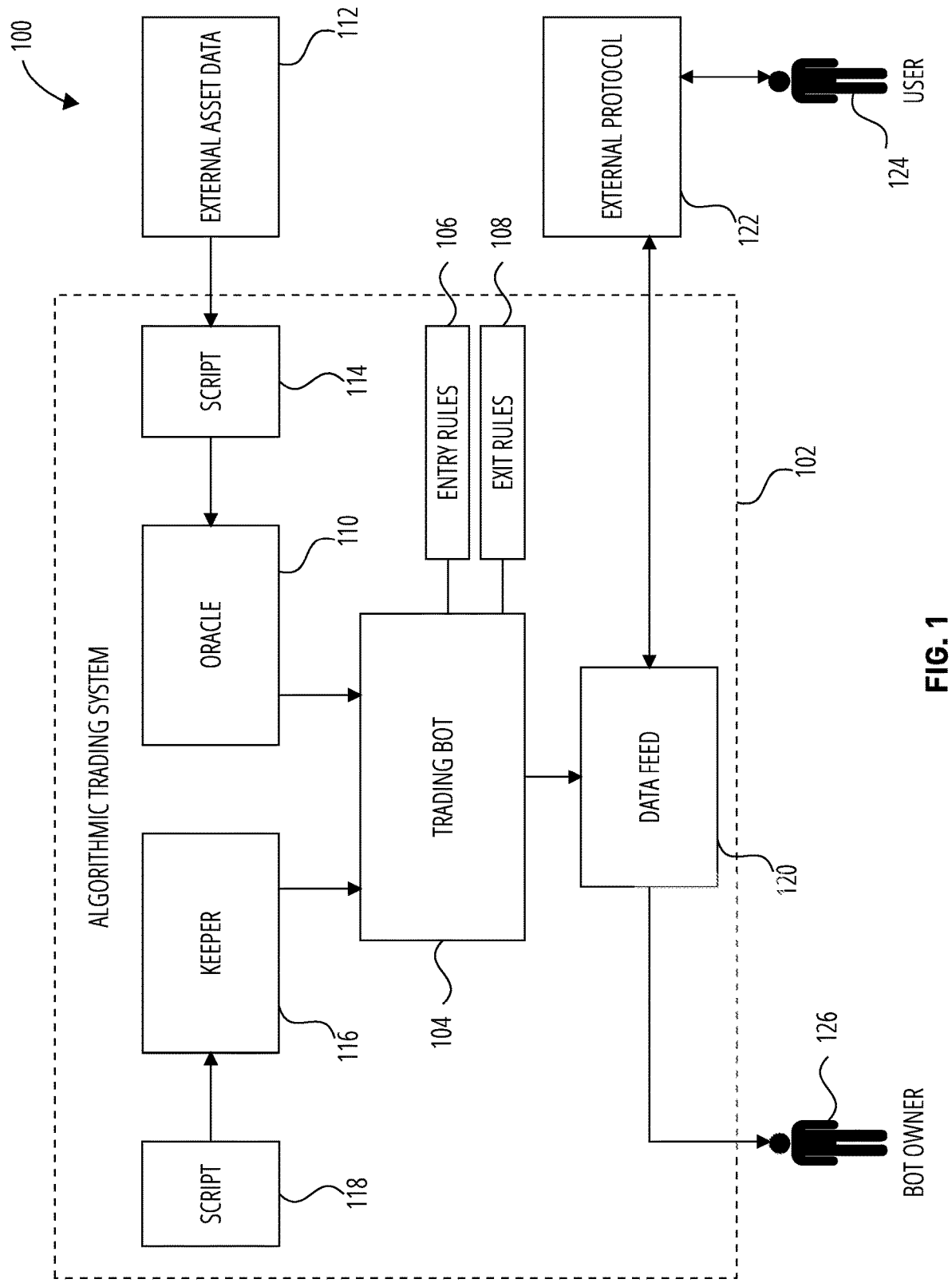
FIG. 1 is a block diagram illustrating components of, and interactions relating to, an algorithmic trading system, according to some examples.

Examples described herein utilize computer-implemented techniques to provide an algorithmic trading system. Example systems and methods enable users to utilize or build upon reusable components to create or implement their own trading strategies.

In some examples, an algorithmic trading system uses a modular architecture of indicators and comparators to allow trading strategies to be easily and efficiently created, iterated, or shared. Indicators process market data into metrics and comparators process indicator outputs, e.g., to automatically apply entry or exit rules. Users may be enabled to create and publish custom indicators and comparators for others to reuse and integrate into trading bots. In some examples, a user can monetize an indicator or comparator design by being rewarded when new instances are created based on the indicator or comparator design.

Examples described herein allow users to leverage their trading insights without needing capital or coding expertise. In some examples, this is achieved via trading bots that automatically execute simulated trades and output their simulated trading performance in real-time as data feeds. A simulated trade may comprise trading of a virtual asset. A price of the virtual asset can be linked to a price of a real-world asset, e.g., a cryptocurrency asset.

External protocols can use these data feeds, e.g., to build tradable synthetic assets representing the strategy of a particular trading bot within the system. For example, whenever an external protocol requests data from a data feed of a trading bot, a reward (e.g., a usage fee) may be automatically allocated to an owner of the trading bot. Furthermore, a trading bot owner may utilize their own strategy on their "real" (e.g., non-simulated) portfolio by purchasing such synthetic assets in external protocols.

Trading bots as described herein may operate automatically, e.g., without active management or without requiring adjustments from developers. For example, asset prices may be automatically obtained, trades may be automatically executed, and a data feed may be automatically updated and accessed by one or more requesting entities.

The term "blockchain network," as used herein, refers to a digital, decentralized, and distributed system, network, or configuration of systems, in which data is stored in multiple records (e.g., "blocks") that are cryptographically linked to each other. Each record or block may contain a list of transactions or other forms of data records, and may be connected to each other through a cryptographic hash function, thus forming a chain. A blockchain network may comprise a single blockchain structure, or multiple, interrelated blockchain systems, e.g., interconnected blockchains, sidechains, or child chains. A blockchain network may include public, private, or hybrid blockchains.

A blockchain network may provide a digital ledger of transactions that is duplicated and distributed across a network of computer systems. Blockchain networks may utilize different consensus mechanisms to validate and verify transactions or data blocks, such as Proof-of-Work (PoW), Proof-of-Stake (PoS), or Delegated Proof-of-Stake (DPoS). A blockchain network accommodates the use of self-executing contracts (e.g., "smart contracts"), decentralized finance ("DeFi") protocols, decentralized applications ("dApps"), non-fungible tokens, blockchain-based data storage, or other applications, services, or tools that are deployable on a blockchain.

In some examples, a self-executing contract is a digital agreement that is automatically executed and enforced by a computing system when certain predefined conditions are met. The self-executing contract contains a set of rules that define the terms of the agreement, as well as the conditions under which the rules are executed. Once the self-executing contract is deployed on the computing system, it operates autonomously to execute the encoded rules when the appropriate conditions are satisfied, without requiring further human intervention. A self-executing contract can be executed by a distributed ledger, such as a blockchain network, or any other system capable of deploying and operating the digital contract. The self-executing contract may be implemented using software code that executes to perform the steps or operations required. It is noted that, in some examples, such as in the case of an Ethereum Virtual Machine™ (EVM) blockchain, the code stored in a self-executing contract is immutable and is guaranteed to execute as described in the deployed bytecode whenever a transaction is sent to the contract.

Examples described herein make use of self-executing contracts to implement an algorithmic trading system on a blockchain network. In some examples, a method includes causing one or more self-executing contracts deployed on a blockchain network to provide (e.g., generate) at least one indicator and at least one comparator.

As used herein, the term "indicator" refers to a component that receives or obtains data about an asset's price or other trading activity data (e.g., volume) and outputs a metric or data point based on the received or obtained data. At least some indicators may represent reusable data transformation logic and may be used as trading bot building blocks. Example indicators may compute or output metrics such as latest price, moving average, volatility, volume weighted price, or momentum. Indicators may process price data using calculations including Bollinger bands, price change percentages, or other price analytics. An indicator may be implemented using one or more self-executing contracts. In some examples, and as described in greater detail elsewhere, an indicator may be one of a parent indicator or a child indicator. A parent indicator may provide original and reusable logic, with a child indicator being a customized instance of the parent indicator with more specific parameters. A child indicator may thus be derived from a specific parent indicator.

As used herein, the term "comparator" refers to a component that receives output from at least one indicator and checks whether a comparator condition is met. For example, a comparator may compare the output of two different indicators by applying a comparison function to determine if the comparator condition is met. In some examples, a comparator outputs a Boolean value indicating whether the comparator condition is satisfied. A comparator may provide reusable logic for defining entry or exit rules in a trading strategy of a trading bot. Example comparators may check whether one indicator is greater than another, whether one indicator has crossed above another, whether an indicator is trending up, check percentage changes, check thresholds, or the like. A comparator may be implemented using one or more self-executing contracts. In some examples, and as described in greater detail elsewhere, a comparator may be one of a parent comparator or a child comparator. A parent comparator may provide original and reusable logic, with a child comparator being a customized instance of the parent comparator with specific parameters, e.g., identifying specific indicators used as inputs to assess the comparator condition. A child comparator may thus be derived from a specific parent comparator.

In some examples, each indicator associated with a trading bot processes external asset data to obtain indicator values, and each comparator associated with the trading bot processes one or more of the indicator values to obtain output indicating whether a comparator condition is met. The trading bot implements predetermined trading rules by using the output of at least one comparator. The trading bot may execute trades according to the predetermined trading rules. As mentioned above, in some examples, the trades may be simulated trades (e.g., trades that do not require an owner of the trading bot to risk actual capital).

A trading bot may be a computer-implemented agent that executes a trading strategy, e.g., by combining various indicators and comparators. The trading bot may be implemented using one or more self-executing contracts. It may simulate trades by mutating its internal state based on new data and comparator outcomes. It may also feed data to other components, such as a data feed that tracks its performance. Trading strategies of trading bots within the algorithmic trading system may be published, versioned, shared, or composed into new strategies.

The method may include instantiating a child indicator based on a parent indicator on the blockchain network, with the parent indicator being used to instantiate a plurality of different child indicators on the blockchain network. The method may include instantiating a child comparator based on a parent comparator on the blockchain network, with the parent comparator being used to instantiate a plurality of different child comparators on the blockchain network. The child comparator may integrate at least a first indicator and a second indicator, e.g., to compare values of the first indicator and the second indicator to determine whether its comparator condition is met.

The algorithmic trading system may obtain the external asset data via a blockchain oracle, e.g., obtain a price of a cryptocurrency asset that is being virtually traded. Execution of a simulated trade may include determining a current indicator value of each indicator, detecting, based on the current indicator value of each indicator, that each comparator condition is met, and executing the simulated trade, according to the predetermined trading rules of the trading bot, responsive to detecting that the comparator condition is met.

A trading bot may utilize a set of comparators, with the predetermined trading rules comprising entry and exit rules implemented by combining the comparators in the set of comparators.

In some examples, the algorithmic trading system generates performance data based on the simulated trades executed by the trading bot. The performance data can be output onto the blockchain network (or another network or device) via a data feed. The method may include providing controlled access to the data feed to enable a requesting entity to utilize the performance data. As mentioned, the requesting entity may, for example, utilize the performance data in a synthetic asset protocol. In some cases, the requesting entity is a self-executing contract (or is represented by a self-executing contract), e.g., an external self-executing contract associated with an external protocol.

In some examples, a requesting entity may only access the performance data of a trading bot after a successful validation or authorization operation. A trading bot owner may monetize the performance data originating from its trading bot. For example, a portfolio value of the trading bot (representing performance of the trading bot in a virtual portfolio) may be used downstream as a token against payment of access fees.

The self-executing contracts deployed on the blockchain network may provide a marketplace for trading ownership rights to trading bots, indicators, and/or comparators. The marketplace may include listings accessible via the blockchain network.

In some examples, the ownership rights are represented by non-fungible tokens (NFTs). Each NFT may represent a specific deployment or instance of a contract, e.g., a specific trading bot, a specific child indicator instance, or a specific child comparator instance. For example, in the case of a trading bot, the algorithmic trading system may automatically generate an NFT representing the trading bot and assign the NFT to an address associated with a user, e.g., a trading bot owner. The NFTs may be used to track component ownership, allocate fees or rewards (e.g., reward an owner of a parent comparator when another user generates an associated child comparator), or effect trades on the marketplace.

Existing algorithmic trading systems may face technical limitations that prevent them from being more fully utilized or "democratized." Examples described herein provide specific technical solutions and improvements to computer systems, architectures, and/or computer-implemented techniques to address these limitations.

In some examples, the system architecture allows for creating, storing, and executing trading strategies on-chain with self-executing contracts. Strategies are defined using modular components instead of monolithic strategy definitions that may lack reusability or efficiency. A keeper network may be implemented to enable reliable, automated on-chain execution without manual oversight.

The algorithmic trading system may generate real-time data feeds of trading bot performance for integration into external systems, e.g., to create tradable assets and new products. In this way, a trading ecosystem may be converted from "zero sum" to "positive sum" by providing utility beyond the trades themselves.

Examples described herein may improve scalability and/or efficiency of computer-implemented systems by addressing or improving one or more of the following:

Modularity: By using separate indicators, comparators, and/or trading bots, users have flexibility without being required to build, code, and test their trading strategies "from scratch." The components are combinable and scalable, e.g., a relatively complex trading bot may be more easily configured using the modular architecture. Furthermore, less computing resources may be required to implement an algorithmic trading system if components are reused or built from other components (e.g., creating a comparator by combining two existing indicators and a parent/template comparator).

Standardization: The algorithmic trading system may utilize indicator and/or comparator "templates," allowing for easy creation of variants and promoting data consistency.

Security: In some cases, components are represented by NFTs, making it easier to track, manage, or secure modules in the algorithmic trading system. Furthermore, the need to connect a trading strategy to a conventional trading or brokerage account may be obviated, thus also reducing the associated security risks.

Accessibility: By using modular building blocks, the barrier for users to contribute to or leverage components of an algorithmic trading system is lowered. For example, logic may be easier to understand when split across modular components versus packed into a monolithic bot script.

Upgradability: In some examples, an algorithmic trading system may be easier to upgrade or improve given that indicator and/or comparator components may be modified or added independently of trading bot logic.

By directly addressing technical deficiencies in one or more of architecture, automation, simulation, modularity, standardization, security, accessibility, and upgradability, examples disclosed herein may provide significant advances towards making algorithmic trading systems, e.g., blockchain-based algorithmic trading systems, more open, efficient and/or accessible to wider audiences.

When the effects in this disclosure are considered in aggregate, one or more of the methodologies or systems described herein may obviate a need for certain efforts or resources that otherwise would be involved in computerized trading systems. Computing resources used by one or more machines, nodes, databases, or networks may be more efficiently utilized or even reduced, e.g., as a result of reusable or modular components requiring less resources, or as a result of automatic or self-executing operations that reduces interactions between end user computing devices and blockchain network nodes. Examples of such computing resources may include processor cycles, network traffic, memory usage, processing unit resources, data storage capacity, power consumption, and cooling capacity.

FIG. 1 is a diagram 100 illustrating components of, and interactions relating to, an algorithmic trading system 102, according to some examples. In FIG. 1, the algorithmic trading system 102 is deployed on a blockchain network, such as the blockchain network 238 of FIG. 2, which is further described below. It is, however, noted that at least some aspects of an algorithmic trading system may be deployed or implemented outside of a blockchain network in some cases.

Referring now specifically to FIG. 1, the algorithmic trading system 102 includes a trading bot 104 that executes a trading strategy, e.g., a set of predetermined trading rules defined or selected by a bot owner 126. FIG. 1 illustrates a single trading bot 104 merely for illustrative purposes, and it will be appreciated that the algorithmic trading system 102 may include a plurality of trading bots. Trading bots may be configured to implement different strategies, but may efficiently and conveniently utilize the modular components described herein.

The trading bot 104 may contain configurable entry rules 106 and exit rules 108. In some examples, the entry rules 106 and the exit rules 108 are represented by comparators that compare or assess data from indicators. The trading bot 104 may contain a data structure, such as an array of "structs," representing its entry rules 106 and exit rules 108. Each struct may include, for example, a comparator identifier (ID) and an instance ID, which may also be referred to as a parent comparator ID and a child comparator ID, respectively identifying a parent comparator and a child comparator, as will be described further below.

The trading bot 104 may include various parameters, such as one or more of name, symbol, time frame, maximum trade duration, profit target, stop loss, asset symbol, and asset time frame. The "maximum trade duration" refers to the number of bot updates after which a trade will be automatically exited, and the "time frame" refers to the time (e.g., number of minutes) between bot updates.

The state of the trading bot 104 may include a Boolean variable indicating whether the trading bot 104 is currently in a trade, the entry price, the entry index, and a timestamp of the last update. The entry index may be seen as the "state update number" at which a trade is entered and may be used to enforce "maximum trade duration," while the timestamp can be used to determine whether the trading bot 104 can be updated.

In some examples, the trading bot 104 executes simulated or virtual trades, e.g., using one or more virtual assets, based on inputs received from indicators that trigger conditions of one or more comparators. For example, a virtual asset may have its price linked to the price of a real-world asset, such as a cryptocurrency asset (e.g., Bitcoin™ or Ethereum™), and the price of the real-world asset may be monitored and reacted to based on the entry rules 106 and exit rules 108. In some cases, the trading bot 104 may have a single fixed asset or asset pair that is defined upfront, while in other cases the trading bot 104 may support multiple assets, multiple positions, and/or dynamic changes to assets held. It is noted, however, that trading bots of the present disclosure are not limited to trading bots that execute simulated or virtual trades.

The trading bot 104 obtains external asset data 112, such as price data, volume data, or other trading-related data, using an oracle 110 that runs on the blockchain network. The oracle 110 may be provided by a self-executing contract that fetches, checks, or stores external price data for various assets.

A script 114 (e.g., a cloud-based script) may run continuously or periodically to fetch the external asset data 112, e.g., via external APIs of cryptocurrency data feeds. The script 114 causes the external asset data 112 to be provided to the oracle 110, from where it becomes available to the trading bot 104.

A keeper 116 is provided to regularly update the trading bot 104. The keeper 116 may, for example, be used where a blockchain network lacks native automation, such as in Ethereum™ blockchains. A script 118 (e.g., a cloud-based script) may run continuously or periodically to "ping" the keeper 116 to trigger updates, e.g., to send update signals to the trading bot 104. For example, the script 118 may run every minute, every two minutes, or every three minutes. The script 118 may fetch all jobs assigned to the keeper 116 and call a suitable function (e.g., "performUpkeep( )") to trigger updates. In some examples, the scripts 114, 118 are off-chain components that call on-chain self-executing contracts to trigger updates.

In some cases, the algorithmic trading system 102 includes a keeper network in which different keepers are assigned to different components, such as trading bots, indicators, and/or comparators. For example, each trading bot, comparator, and indicator may have a dedicated keeper assigned to it. In some examples, the trading bot 104 can only be updated once per defined time frame, and only the dedicated keeper 116 for that specific trading bot 104 can call the relevant "update( )" function.

When performing a simulated trade, the trading bot 104 may send (or make available) data indicative of the trade to a data feed 120. In some examples, the data feed 120 tracks performance data that indicates a lifetime performance of the trading bot 104 or performance over a particular period. It will be appreciated that various metrics or measures may be used to quantify or express the performance of the trading bot 104. The data feed 120 passes the performance data to an external protocol 122 when requested.

In some examples, the algorithmic trading system 102 controls access to the performance data in the data feed 120, e.g., by requiring a requesting entity (e.g., the external protocol 122) to pay a data usage payment or by checking whether an address of the requesting entity is authorized to use or access the performance data before allowing access or use thereof. Fees obtained in this manner (or portions thereof) may be routed to the bot owner 126.

In some examples, the data feed 120 outputs a real-time (or near real-time) stream of performance data of the trading bot 104 representing its performance in simulating trades based on the entry rules 106 and the exit rules 108, as well as any other predetermined trading rules. The external protocol 122 may integrate this data feed 120, e.g., generate tradable assets representing the strategy of the trading bot 104. For example, a user 124 of the external protocol 122 can trade synthetic assets in the external protocol 122 by minting tokens based on the simulated performance of the trading bot 104. If a synthetic asset protocol wishes to mint tokens representing this strategy, it may request, for example, a latest simulated price or portfolio value from the data feed 120 and pay a required fee.

The bot owner 126 may interact with the algorithmic trading system 102, e.g., by setting or changing parameters of the trading bot 104, creating new comparators or indicators, publishing such components to the algorithmic trading system 102, or trading in such components via a marketplace, as further described below. The bot owner 126 may be an individual, a group, an organization, a machine, a program, or combinations thereof. In some examples, the trading strategy of the trading bot 104, as defined or set by the bot owner 126, is stored on-chain in state variables.

Still referring to the trading bot 104, in some examples, a trading bot generated in the algorithmic trading system 102 is represented by an NFT that can be traded between users of the algorithmic trading system 102, on a marketplace of the algorithmic trading system 102, or an external marketplace, e.g., that supports the Ethereum™ ERC-1155 token standard (enabling transfer of tokens).

The owner of the trading bot 104, as well as owners of comparator or indicators, may collect fees whenever another entity, e.g., an external contract, requests data from or utilizes the relevant component, thereby creating an incentive for users to create effective, useful, and reusable components. The owner or operator of the trading bot 104 may update the parameters or rules of the trading bot 104 when it is not in an active trade. The owner may also change the role of "operator" to another user or to a self-executing contract.

As mentioned, in some examples, rather than executing real trades on actual assets, the trading bot 104 may carry out simulated trades. This approach may provide several benefits, such as one or more of the following:

- Support can be provided for leveraged positions without concerns over liquidity. Trade sizes can be amplified by simply multiplying price changes by a scalar value. There is no limit imposed by the actual liquidity available on an exchange.
- Dependence on any specific exchange for order execution can be avoided. This prevents the algorithmic trading system 102 from being impacted by issues with a particular exchange and improves robustness.
- No price manipulation or front-running is possible. As orders are not placed on an actual exchange, malicious actors cannot manipulate market liquidity or prices to negatively impact order fills.
- No slippage or exchange fees are applicable. Users can create high frequency trading strategies without worrying about exchange costs eating into profits.
- Profit potential becomes more dependent on strategy quality than amount of capital. This may assist in creating a more level playing field between users with differing account sizes.

As alluded to above, the algorithmic trading system 102 may utilize a parent-child architecture model for its indicators and comparators. For example, each parent indicator can have multiple child indicator instances, and each parent comparator can have multiple child comparator instances. A child instance may represent a unique configuration of parameters for that indicator or comparator.

The following example illustrates this architecture:

Parent indicator: BTC/USD price.

First child indicator: 20-period simple moving average (SMA) of BTC/USD price.

Second child indicator: latest BTC/USD price.

The first child indicator and the second child indicator are thus based on, or derived from, the parent indicator, which can be seen as a "template."

Parent comparator: crosses above.

Child comparator: combines the first child indicator and the second child indicator and is derived from the parent comparator. It checks (as comparator condition) whether the latest BTC/USD price crosses above the 20-period SMA BTC/USD price, and outputs true/false.

The child comparator can be used by the trading bot 104 as an entry or exit rule, e.g., such that the trading bot 104 enters a trade when the child comparator returns "true."

In some examples, a comparator or indicator (whether it is a parent or child) is represented by an NFT, allowing the owners of such NFTs to be rewarded when others utilize their components. For example, when other users create child instances from a parent comparator, the owner of the parent comparator may be automatically rewarded with "instance creation fees," or when users integrate instances into a trading bot, the owners of the relevant instances (e.g., child indicators) can be automatically rewarded with "integration fees." New comparators or indicators may be reviewed (either manually or automatically) before being registered within the algorithmic trading system 102, e.g., to ensure that components are unique, useful, and/or secure.

The parent-child architecture model may allow components to be reused while still providing incentives to component creators via instance creation and integration fees. Keepers may be used to ensure child instances stay up-to-date through paid upkeep. This structure facilitates an ecosystem of composable and reusable components. Further examples of comparators and indicators are provided with reference to FIGS. 5-9 below.

It is noted that the components in FIG. 1 are shown primarily for illustrative purposes. Interactions between components or layers may be complex, e.g., some parts may self-execute on a blockchain network while other parts are provided by off-chain computer systems. The algorithmic trading system 102 can be implemented using a combination of software and hardware components. Two or more of the components or layers of FIG. 1 may be combined into a single component, and the functions described herein for a single component may be subdivided among multiple components. Furthermore, according to various examples, aspects of a component described herein may be performed by a single machine, database, or device, or may be distributed across multiple machines, databases, or devices, e.g., interconnected through a network.

Figure 2:
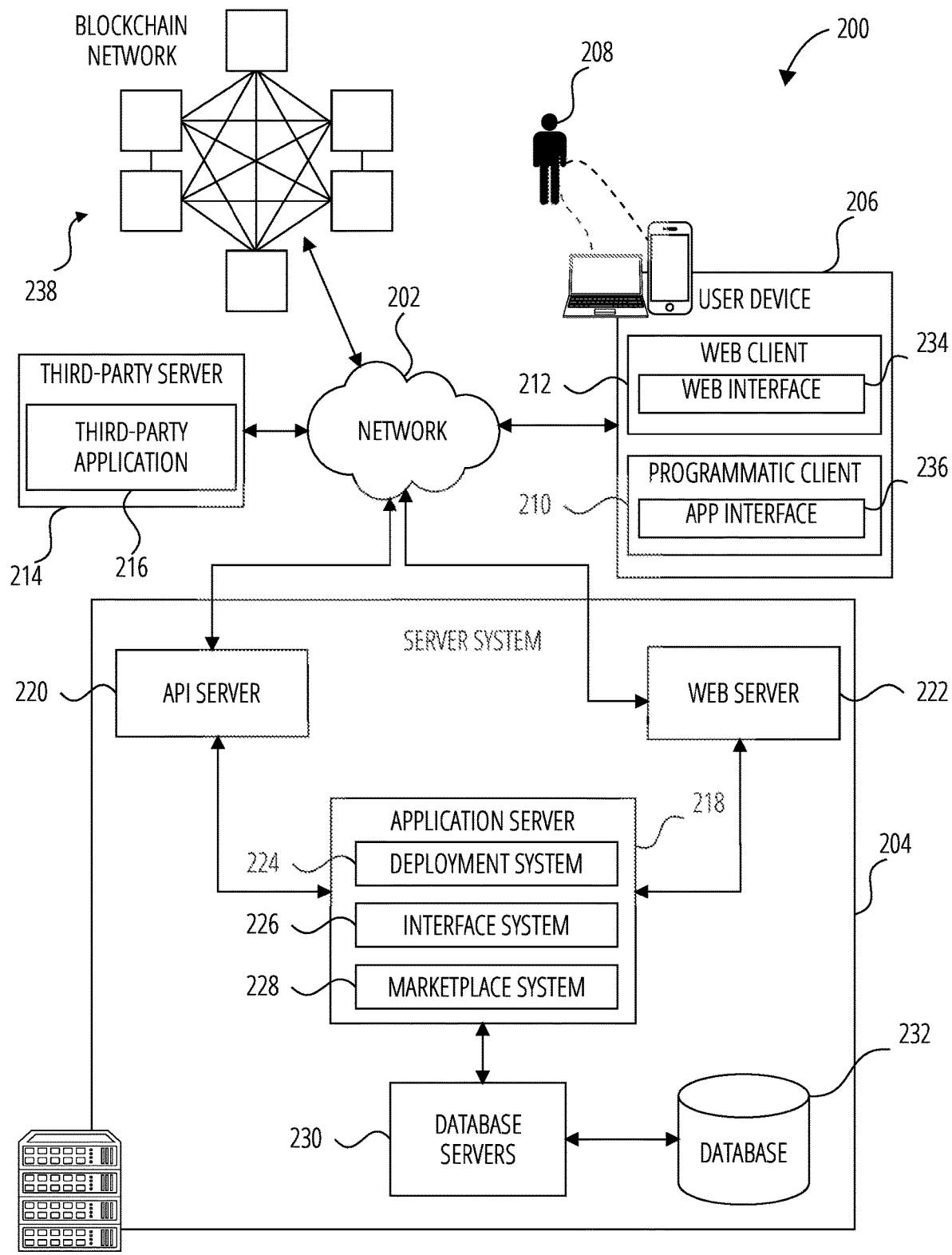
FIG. 2 is a diagrammatic representation of a networked computing environment suitable for deploying self-executing contracts and providing an algorithmic trading system, according to some examples.

FIG. 2 is a diagrammatic representation of a networked computing environment 200 in which aspects of some examples of the present disclosure may be implemented or deployed. In some examples, the networked computing environment 200 is used to implement an algorithmic trading system, such as the algorithmic trading system 102 of FIG. 1.

One or more servers in a server system 204 provide server-side functionality via one or more networks 202 to a networked device, in the example form of a user device 206 that is accessed by a user 208. The user 208 may, for example, be a trading bot owner. As described further below, the user 208 may generate one or more trading bots, comparators, and/or indicators. The user 208 may also trade ownership rights in trading bots, comparators, and/or indicators. Other users, e.g., entities referred to herein as requesting entities, may also communicate with the server system 204, e.g., to request access to performance data of a trading bot associated with the user 208.

A web client 212 (e.g., a browser) or a programmatic client 210 (e.g., an "app") may be hosted and executed on the user device 206. An API server 220 and a web server 222 provide respective programmatic and web interfaces to components of the server system 204. A specific application server 218 hosts a deployment system 224, an interface system 226, and a marketplace system 228, each of which includes components, modules, or applications.

The user device 206 can communicate with the application server 218, e.g., via the web interface supported by the web server 222 or via the programmatic interface provided by the API server 220. It will be appreciated that, although only a single user device 206 is shown in FIG. 2, a plurality of user devices may be communicatively coupled to the server system 204 in some examples. Further, while certain functions are described herein as being performed at either the user device 206 (e.g., web client 212 or programmatic client 210) or the server system 204, the location of certain functionality either within the user device 206 or the server system 204 may be a design choice. In some examples, particular technology and functionality may be deployed within the server system 204. In other examples, such technology and functionality may be deployed within a programmatic client.

The application server 218 is communicatively coupled to database servers 230, facilitating access to an information storage repository or database 232. In some examples, the database 232 includes storage devices that store information to be processed or transmitted by the deployment system 224, by the interface system 226, or by the marketplace system 228, e.g., details of self-executing contracts, details of trading bots, comparators or indicators, or details of performance data of trading bots.

Figure 3:
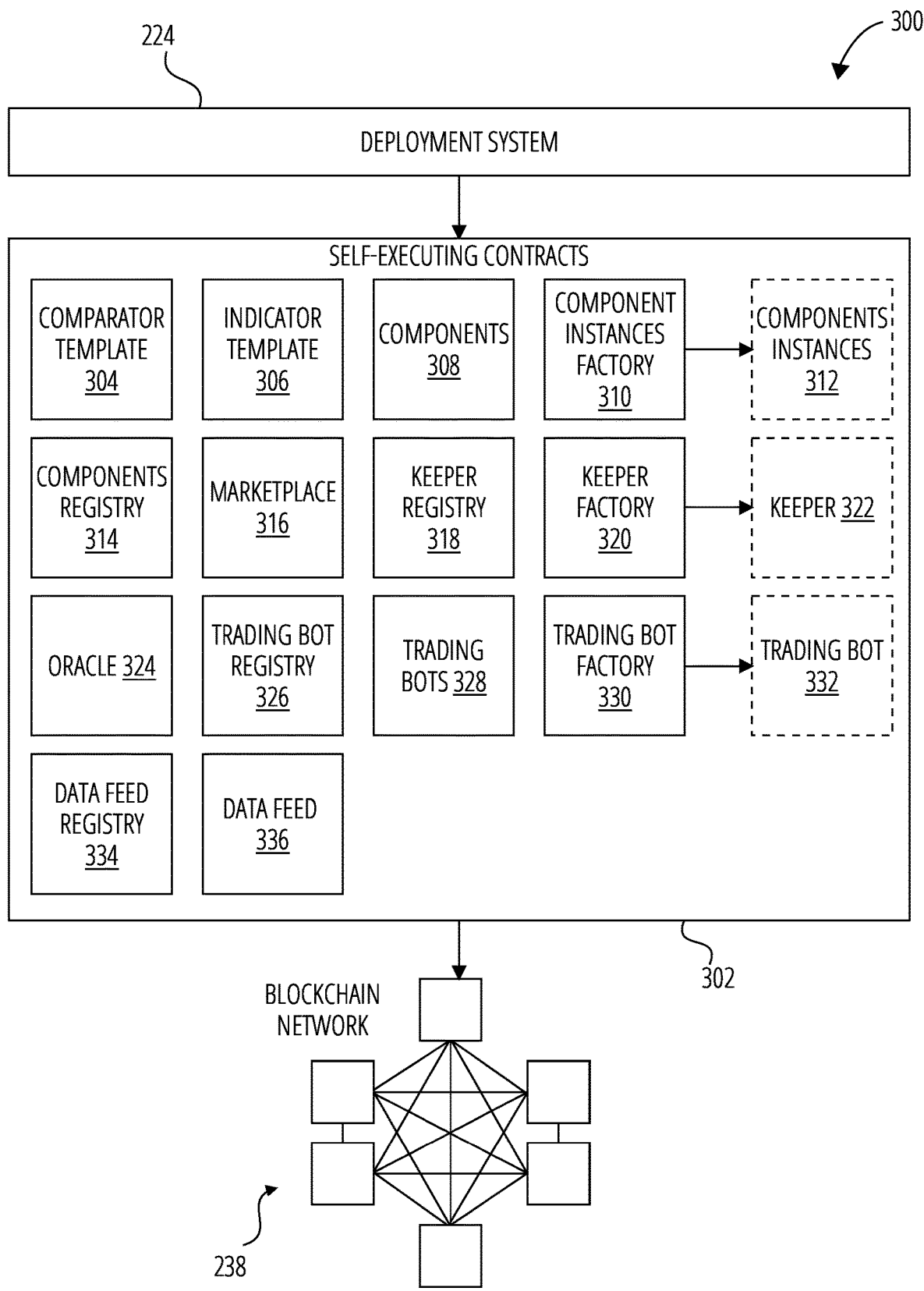
FIG. 3 is a diagrammatic representation of the deployment of a plurality of self-executing contracts to a blockchain network to provide an algorithmic trading system, according to some examples.

The application server 218 uses the deployment system 224 to deploy a set of self-executing contracts to a blockchain network 238 in order to provide certain functionality of or in relation to an algorithmic trading system, e.g., the algorithmic trading system 102. Examples of such self-executing contracts are shown in FIG. 3. The user 208 may interact with the blockchain network 238 to set up a trading bot that performs automated trades, e.g., simulated trades. Further, and as described below, external entities, such as external blockchain-based protocols, may also interact with the blockchain network 238, e.g., to obtain performance data.

The blockchain network 238 may be a network of computing devices or computing nodes (e.g., a peer-to-peer network) that stores and manages at least one blockchain. The blockchain is a list of records, called blocks, that are cryptographically linked. In some examples, the blockchain network 238 is an Ethereum™ blockchain network. The blockchain network 238 may store blocks, calculate new blocks, process transactions (e.g., via self-executing contracts) and the like.

The application server 218 further, via the interface system 226, accesses application data (e.g., application data stored by the database servers 230) to provide an application to the user device 206 via a web interface 234 or an app interface 236. The application may be an algorithmic trading app. The algorithmic trading app may facilitate creation of components by the user 208 on the blockchain network 238. The user 208 may access the algorithmic trading app using a dedicated programmatic client 210 (e.g., installed on a computing device, such as a desktop computer or a portable computing device), with some functionality being provided client-side and other functionality provided server-side. Some or all functionality of the algorithmic trading app may thus be deployed by a programmatic client 210 executing on the user device 206.

In some examples, the user 208 may either directly access the blockchain network 238 (e.g., by calling self-executing contract functions directly via the network 202) via the network 202 or utilize functionality of the algorithmic trading app to facilitate or simplify accessing of the blockchain network 238. The interface system 226 may provide a GUI via the app interface 236 or the web interface 234 that enables the user 208 to provide input data and view or receive outputs generated by the interface system 226. For example, the GUI may enable the user 208 to generate a trading bot, configured trading rules, receive rewards based on data access by third parties, and trade in components (as described below).

In some examples, the algorithmic trading app is designed to "abstract away" certain technical aspects of blockchain-driven transactions, making it easier for users to interact with a blockchain-based algorithmic trading system. For example, the algorithmic trading app may simplify the creation and deployment of a trading strategy, transaction approval, investments, trades, or gas fees, and may make it easier for users to view data such as transaction status, investment status, or performance data.

To access the algorithmic trading app, the user 208 may create an account with an entity associated with the server system 204, e.g., a service provider (or access an existing account with the entity). The user 208 may use account credentials to access the app interface 236 or web interface 234 (via a suitable web browser) and request access to the algorithmic trading app.

The algorithmic trading app may integrate with a wallet that facilitates transactions on the blockchain network 238. Alternatively or additionally, the user may have a wallet running on the user device 206. The wallet may be used, for example, to manage and store private keys securely. In some examples, when a transaction is initiated on the GUI of the interface system 226, the wallet signs the transaction with the private key. This signed transaction provides cryptographic proof that the transaction is authorized by the holder of the wallet without revealing the private key itself. Once a transaction is signed, it may be propagated through the blockchain network 238 via nodes in the blockchain network 238. The transaction may be in a pending stage at first, after which it may be picked by a miner or validation and included in a next block. When a transaction is included in a block, the relevant self-executing contract on the blockchain network 238 carries out the instruction set in the transaction. For instance, in the case of a trade involving a user selling an NFT representing a trading bot, the self-executing contract ensures that the trade happens at an agreed rate and may transfer tokens (e.g., protocol governance tokens) between different wallets. The wallet may then update a balance and transaction state, which may be reflected on the GUI of the algorithmic trading app.

The application server 218 may also provide a marketplace, e.g., via the marketplace system 228. The marketplace system 228 may allow the user 208 to provide other users or entities with access to performance data of a trading bot. The marketplace system 228 may also allow users to trade in NFTs representing components of the algorithmic trading system 102, such as trading bots, comparators, and/or indicators. Furthermore, the marketplace system 228 may allow a user to be rewarded when other users utilize or integrate their components, as described below. The marketplace system 228 may facilitate payment by a requesting entity to the user 208 in exchange for access to performance data or integration of components. The marketplace system 228 may provide a GUI that can be used by the user 208 (e.g., as part of the algorithmic trading app or separately) or by a requesting entity, e.g., to view or set fees associated with data access or component use, to view balances, to change or request access rights, or the like.

One or more of the application server 218, the database servers 230, the API server 220, and the web server 222 may each be implemented in a computer system (e.g., a personal computer, a tablet computer, or a mobile phone), in whole or in part, as described below with respect to FIG. 12. In some examples, third-party applications, such as a third-party application 216 executing on a third-party server 214, can communicate with the application server 218 via the programmatic interface provided by the API server 220. For example, a third-party application may support one or more features or functions on a website or platform hosted by a third party, or may perform methodologies described herein and provide input or output information to the application server 218 for further processing or publication.

The network 202 may be any network that enables communication between or among machines, databases, and devices. Accordingly, the network 202 may be a wired network, a wireless network (e.g., a mobile or cellular network), or any suitable combination thereof. The network 202 may include one or more portions that constitute a private network, a public network (e.g., the Internet), or any suitable combination thereof.

Any one or more of the components (e.g., systems or modules) described herein may be implemented using hardware (e.g., a processor of a machine) or a combination of hardware and software. For example, any component described herein may configure a processor to perform the operations described herein for that component. Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices.

FIG. 3 is a diagram 300 illustrating the deployment of a plurality of self-executing contracts 302 to the blockchain network 238 of FIG. 2 to provide an algorithmic trading system, according to some examples. The self-executing contracts 302 may be deployed in the networked computing environment 200 of FIG. 2, e.g., by the deployment system 224, as is shown in FIG. 3. The algorithmic trading system deployed by the self-executing contracts 302 may be similar to the algorithmic trading system 102 of FIG. 1.

The self-executing contracts 302 are shown to include a comparator template contract 304, an indicator template contract 306, a components contract 308, a component instances factory contract 310, a components instances contract 312, a components registry contract 314, a marketplace contract 316, a keeper registry contract 318, a keeper factory contract 320, a keeper contract 322, an oracle contract 324, a trading bot registry contract 326, a trading bots contract 328, a trading bot factory contract 330, a trading bot contract 332, a data feed registry contract 334, and a data feed contract 336.

It is noted that the self-executing contracts 302 shown in FIG. 3 are shown to illustrate certain examples and are not intended to be restrictive examples. It is noted that, in some examples, two or more of the self-executing contracts shown in FIG. 3 may be combined into a single contract, and functions described herein for a single contract may be subdivided among multiple contracts.

Referring firstly to the comparator template contract 304, this contract 304 may contain core logic for determining whether a comparator condition is met, e.g., for comparing two indicator values and returning a Boolean output indicating if conditions are met. The comparator template contract 304 is "templated" so that it can be reused as the basis for different comparison-based entry or exit rules. Users can create and publish their own comparator contracts following this template. In some examples, the comparator template contract 304 is used to create parent comparators, as described in greater detail elsewhere.

The indicator template contract 306 serves as a template for defining metrics based on external data, such as external price data. It may contain logic to take such data for a given asset, perform computations on the data, and output a new indicator value. For example, the contract may compute a 20-period moving average from latest prices. Again, the contract is "templated" so that users can create customized indicators. In some examples, the indicator template contract 306 is used to create parent indicators, as described in greater detail elsewhere.

The components contract 308 handles token logic (e.g., ERC-1155 logic) to track ownership of NFTs representing each indicator and comparator, e.g., each indicator and comparator published in the algorithmic trading system 102. In some examples, there is only one instance of this contract that is used for all indicators and comparators. The components contract 308 may store a mapping from a component's identifier to its associated components instances contract 312.

The component instances factory contract 310 is used to deploy a components instances contract 312 for a new instance of a comparator or indicator. In some examples, this "new instance" refers to a new child comparator derived from a parent comparator, or new child indicator derived from a parent indicator. In some examples, blockchain size limits may be overcome by keeping the instance logic separate from the factory and other logic. In some examples, only the components registry contract 314 interacts with the component instances factory contract 310.

The components instances contract 312 may be created for indicators and comparators created in or registered with the algorithmic trading system. In some examples, only the components registry contract 314 can interact with a components instances contract 312. The components instances contract 312 may track child instances of indicators or comparators, and handle token logic for each child instance of a given indicator or comparator. In some examples, child indicators are represented as state variables (e.g., structs) in the corresponding parent indicator contract (e.g., a contract such as the contract 306) and child comparators are represented as state variables (e.g., structs) in the corresponding comparator indicator contract (e.g., a contract such as the contract 304). The relationships between parent and child components are further described below.

The components registry contract 314 is responsible for registering new indicators and comparators, tracking their on-chain state, allowing users to purchase instances, and providing functions to view parameters and statuses. The components registry contract 314 may also provide functions for viewing information on specific comparators or indicators (e.g., parents or children), such as the state, whether upkeep can be performed, whether an instance is active, or whether a comparator meets its comparator conditions.

The marketplace contract 316 enables users to buy and sell trading bots, indicators, and/or comparators, as described above. In some examples, listings are stored in structs with relevant data, such as seller details, price, component type, component identifier, and token identifier. The marketplace contract 316 may generate and return listings with strictly increasing listing identifiers. In other words, the marketplace contract 316 may have an increasing index instead of deleting listings. On-chain storage of listings provides a verifiable location for finding and trading components. The marketplace contract 316 may also perform an escrow function during a sale, as described further below. In some examples, the application server 218 may provide a GUI (e.g., via the algorithmic trading app) that facilitates user usage of the marketplace.

The keeper registry contract 318 is responsible for registering keepers, assigning jobs to keepers, and managing funds collected from users for keeper functions. The keeper factory contract 320 is responsible for deploying new keeper contracts 322, and is called by the keeper registry contract 318. The keeper registry contract 318 and the keeper factory contract 320 may be provided separately to overcome size limits. The keeper contract 322 contains jobs assigned to its associated keeper. For example, the keeper contract 322 runs to check whether a specific component can be updated and calls "performUpkeep( )" to trigger updates. The keeper contract 322 may be called regularly by a keeper node, e.g., via a script running in the cloud, as shown in FIG. 1.

Referring to keepers generally, on blockchains such Ethereum, an algorithmic trading system may require a network of keepers to regularly update the state of trading bots and component instances. These keepers call specific functions in the respective self-executing contracts on a recurring basis, e.g., to trigger state updates. In use, a user may register to become a keeper in the network by deploying a keeper contract 322 and running the associated cloud script. This structure may allow the system to ensure regular upkeep without relying on external networks. Users may choose from competing keepers based on reputation and fees charged. The decentralized nature of such a keeper network improves robustness of an algorithmic trading system, e.g., if one keeper goes down, the remaining keepers continue with maintenance.

Still referring to FIG. 3, the oracle contract 324 provides an on-chain external asset data feed by fetching latest data from external sources, as described with reference to FIG. 1. A trading bot in the algorithmic trading system may, for example, source price data from the oracle contract 324 when executing trades. An indicator may also obtain its input data from the oracle contract 324.

The trading bot registry contract 326 is responsible for registering new trading bots and storing system parameters. The trading bot registry contract 326 may also provide functions to view aspects such as bot parameters, status, keeper assignment, or the like. The trading bots contract 328 may implement token logic (e.g., ERC-1155 logic) to track ownership of NFTs representing trading bots. In some examples, a single trading bot registry contract 326 is used across the trading ecosystem.

The trading bot factory contract 330 is used to deploy new trading bot contracts 332. The trading bot factory contract 330 may be called by the trading bot registry contract 326, and these two contracts may be separated to overcome size limits. The trading bot contract 332 contains the logic to implement a trading strategy, e.g., state variables, entry and exit rules, and other parameters or algorithms. A unique trading bot contract 332 may be deployed for each trading bot and, in some cases, each trading bot contract 332 may be associated with an NFT. A user (e.g., the bot owner 126 of FIG. 1) may be enabled to call functions in the trading bot contract 332 to modify or add parameters after deployment, e.g., to change a trading strategy.

As explained elsewhere, a trading bot may have a data feed linked thereto. The data feed registry contract 334 may be responsible for creating a data feed contract 336 for the trading bot. In some cases, each trading bot may have a dedicated and/or unique data feed contract 336. The data feed registry contract 334 further provides functions for interacting with a data feed contract 336. In some examples, only the data feed registry contract 334 is able to generate a data feed contract 336 to ensure control over data feeds, e.g., to ensure that each trading bot only has one data feed for access control or fee payment purposes.

The data feed contract 336 tracks the performance of a trading bot, e.g., its return on investment (ROI) or some other predefined performance metric, and handles requests for performance data. In some cases, the data feed contract 336 enforces a paywall for accessing the trading bot's price (e.g., portfolio value or ROI). In some cases, a requesting entity (e.g., the external protocol 122 of FIG. 1) can view the data in the data feed contract 336 if they pay the data request fee specified by the owner, e.g., the bot owner 126 of FIG. 1. The data feed contract 336 may update the order history of a trading bot whenever the trading bot executes a trade, e.g., a simulated trade.

The self-executing contracts 302 may allow the algorithmic trading system to operate automatically or substantially automatically, including the execution of simulated trades, updating of prices, and performance tracking. Main contracts, e.g., contracts that are not deployed by factory contracts, may, for example, be deployed using the "Ethers" Javascript library. "Ethers" is a Javascript library that allows interacting with the Ethereum™ blockchain from Javascript applications, and it can be used to deploy self-executing contracts. A contract may be deployed from a one-time script, e.g., a script that runs once to deploy each contract.

Figure 4:
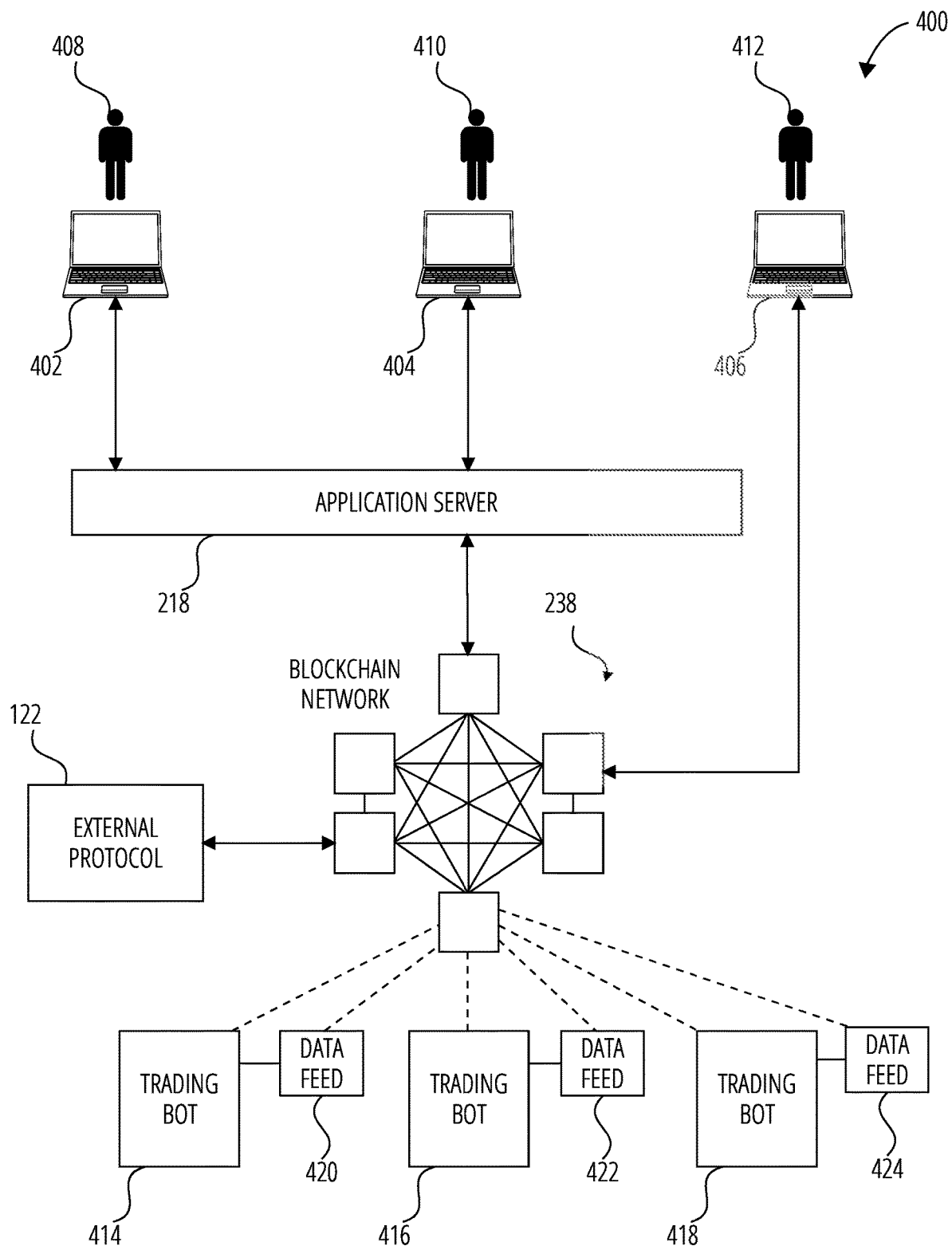
FIG. 4 is a diagrammatic representation of users and an external protocol interacting with trading bots and data feeds on a blockchain network, according to some examples.

FIG. 4 is a diagram 400 showing a plurality of entities in the example form of users 408, 410, and 412. Each of the users 408, 410, 412 has a user device 402, 404, 406. One or more of the user devices 402, 404, 406 may be similar to the user device 206 of FIG. 2.

Each user 408, 410, 412 uses their respective user device 402, 404, 406 to access one or more of the self-executing contracts 302 of FIG. 3 after the self-executing contracts 302 are deployed to the blockchain network 238. The self-executing contracts 302 may be deployed to provide an algorithmic trading system, such as the algorithmic trading system 102 of FIG. 1.

As depicted in FIG. 4, the users 408, 410, 412 can access the blockchain network 238 directly or can use the application server 218 (e.g., its interface system 226) to facilitate or simplify performing transactions. The users 408, 410, 412 can also access the marketplace provided via the application server 218, in some examples.

FIG. 4 also shows a plurality of trading bots 414, 416, 418. For example, the user 408 may be the owner of the trading bot 414, while the user 410 is the owner of the trading bot 416, and the user 412 is the owner of the trading bot 416. Ownership may be represented by respective NFTs minted in association with the relevant trading bots.

As mentioned, each trading bot 414, 416, 418 can have its performance automatically tracked. To this end, in the case of FIG. 4, when the trading bots 414, 416, 418 are created on the blockchain network 238, a respective data feed 420, 422, 424 is also generated for each trading bot 414, 416, 418. An external protocol, e.g., the external protocol 122, can access performance data via the data feeds 420, 422, 424.

The algorithmic trading system of FIG. 4 allows the users 408, 410, 412 to have their trading bots 414, 416, 418 automatically perform simulated trades on virtual assets and monetize the performance data from those simulated trades, e.g., by charging a fee for access to a protocol wishing to tokenize the performance data.

In this way, a user can benefit from the performance data and external parties, e.g., developers, can use the performance data to build protocols that tokenize performance. For example, the external protocol 122 may be a synthetic asset protocol using the value of the trading bot 414 as a token to track its price, e.g., with 18 decimals of precision to enable trading similar to a cryptocurrency token. However, the "price" of a trading bot in its data feed may represent the performance of simulated trades rather than the price of an existing cryptocurrency.

Referring now to the architecture of comparators and indicators, according to some examples, a trading bot has entry and exit rules that define comparators. For example, an entry rule may be provided in a struct storing a comparator ID and an instance ID. The comparator ID may identify a parent comparator and the instance ID may identify a specific child instance of the parent comparator, as will become more apparent from the examples that follow.

The child comparator may include identifying information that comprises, for example, an identifier of a first child indicator that feeds data to the child comparator, an identifier of a parent indicator of the first child indicator, an identifier of a second child indicator that feeds data to the child comparator, and an identifier of a parent indicator of the second child indicator. In some cases, a child comparator may integrate only a single indicator, or more than two indicators, and the above example including first and second child indicators should thus be understood to be a non-limiting example.

Referring more specifically to indicators, an indicator may essentially act as a data feed that provides external asset data to, or processes external asset data for use by, a comparator. In some examples, an indicator performs a calculation on the external asset data to obtain an indicator value (e.g., average price calculated from a price feed). In other examples, the indicator uses external asset data directly as the indicator value (e.g., latest price). The comparator that integrates the relevant indicators then takes these indicator values as inputs and processes (e.g., compares) them to determine whether a comparator condition is met. While the examples provided with reference to FIGS. 5-9 focus on price-related indicators, other indicators may also be used, e.g., trading volume related indicators.

In some examples, the algorithmic trading system is deployed with preconfigured or "default" indicators. For example, the algorithmic trading system may include one or more of the following default indicators: "down," "exponential moving average (EMA)," "high of last N price updates," "interval," "latest price," "low of last N price updates," "N percent," "Nth price update," "previous N price updates," "SMA," and "up". It is noted that the abovementioned default indicators are parent indicators.

Some indicators may always return the same static value, such as "down," "N percent," and "up." This value may be determined when an indicator instance (e.g., child indicator) is created, either through its parameters or hard-coded into the contract, and any comparator that interacts with this instance will receive the same value each time. For example, the "down" indicator may always return 0, the "up" indicator may always return 1, and the "N percent" indicator may always return N, where N is one of the parameters.

Other indicators may return an array of values over time, such as "previous N price updates." Comparators that integrate these array-based indicators may, for example, compare the first element to the last element of the array, or check if each element in the array meets certain threshold conditions.

In some examples, indicator contracts follow a template structure with state mappings, a list of parameters, functions for viewing state, parameters, history and/or status, a function for creating an instance, and a function for updating the state. The state mappings map an instance number to parameters, update count, history, last updated timestamp, indicator time frame, and keeper address. The parameters may consist of the asset symbol, asset time frame, and any indicator-specific configuration values. For example, an indicator-specific value for a child EMA indicator may be the period.

Indicator contracts may differ in the sense that they have unique implementations of the "update( )" function. In some examples, only a dedicated keeper assigned to a specific indicator can call the "update( )" function for that indicator. Furthermore, only the components registry contract 314 may be able to call a "createInstance( )" function to generate a new instance, e.g., to generate a new child indicator.

In some examples, each child indicator derived from a parent indicator may represent a unique combination of asset symbol, asset time frame, indicator-specific values, and indicator time frame. For example, one child indicator derived from the EMA parent indicator may be a 20-period EMA indicator for BTC prices on a 1-minute time frame, updating every 3 minutes.

In some examples, when updating the value of an indicator, a current value and state may be used to efficiently calculate a delta based on latest asset price data. This may allow an update to complete in O(1) time instead of O(n). As an example, to calculate a SMA, an indicator contract may only consider the effect of the latest price on the current SMA value, rather than completely recalculating the SMA based on a full window of the last N prices. The indicator state may store the partial calculations required to perform this efficient O(1) update. For a SMA, the state would store the sum of the last N price elements.

In some examples, an indicator can only be updated once per its defined time frame. If an update does not occur, for example, within 3 minutes of the expected update time, the indicator will be marked inactive. As mentioned, each indicator instance may have a dedicated keeper responsible for regularly calling the "update( )" function to keep the indicator data up to date.

Referring now specifically to comparators, a comparator may take indicator values from one or more indicators to check a condition. For example, a comparator can take in the output values from two separate indicator instances and apply a comparison function to them, returning a flag indicating whether the condition is true or false.

In some examples, the algorithmic trading system is deployed with preconfigured or "default" comparators. For example, the algorithmic trading system may include one or more of the following default comparators: "closes," "crosses above," "crosses below," "fall by at least," "fall by at most," "falls to," "is above," "is below," "rise by at least," "rise by at most," and "rises to." It is noted that these examples are parent comparators.

Comparator contracts may differ in the sense that they have unique implementations of a "checkConditions( )" function, e.g., that compares indicator values. In some examples, only the dedicated keeper assigned to a specific comparator can call the "checkConditions( )" function to evaluate that comparator. In some cases, only the components registry contract 314 may call the "createInstance( )" function to generate a new comparator instance.

In some examples, comparator contracts follow a template structure with state mappings, references to indicator contracts integrated with the child comparator, functions for viewing state or status, a function for creating an instance, and the abovementioned "checkConditions( )" function. The state mappings of a child indicator contract may map the instance number to the addresses of the indicators, the specific instance IDs of those indicators, the update count, the comparator time frame, and the keeper address.

Each instance of a child comparator may represent a unique combination of child indicators (e.g., a pairing of two child indicators). In some examples, when evaluating conditions, a comparator retrieves the latest values of its associated child indicators, but does not modify their states. The "checkConditions( )" function may be configured to handle both single value and array value outputs from the indicators. The time frame of a comparator may be defined by the minimum time frame of its indicators. Similar to indicators, in some examples, a comparator can only be updated once per time frame and may thus be marked inactive if not updated in an expected time frame. To enable efficient O(1) updates, a comparator may store an array of cached values that represent parts of the computation performed when checking conditions.

Figure 5:
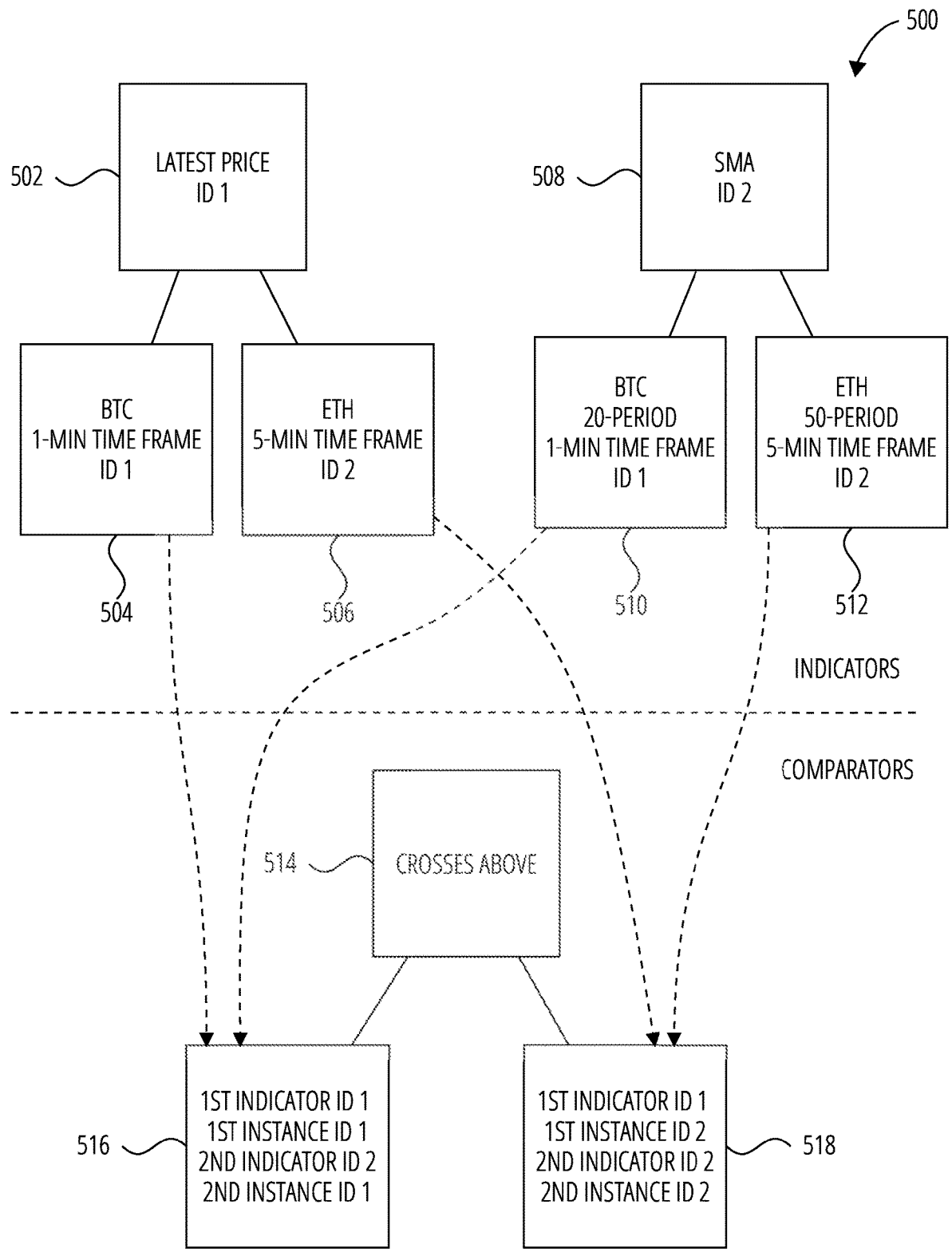
FIG. 5 is a block diagram illustrating the manner in which indicators can be integrated or associated to define comparators for trading bots in an algorithmic trading system, according to some examples.

FIG. 5 is a diagram 500 illustrating the manner in which indicators can be integrated or associated to define comparators in an algorithmic trading system, such as the algorithmic trading system 102 of FIG. 1, according to some examples.

FIG. 5 shows two parent indicators. The first parent indicator is a latest price parent indicator 502 that has two child indicators: a latest price child indicator 504 and a latest price child indicator 506. The second parent indicator is a SMA parent indicator 508 that has two child indicators: a SMA child indicator 510 and a SMA child indicator 512. Indicators are modular components and can be "mixed and matched" to create comparators and trading bots in an efficient and convenient manner.

FIG. 5 further shows one parent comparator and two child comparators. A crosses above parent comparator 514 is shown with its two associated child instances, a crosses above child comparator 516 and a crosses above child comparator 518.

The crosses above child comparator 516 is formed as follows:
    A trading strategy involves buying Bitcoin™ (BTC) when the price as indicated by the latest price child indicator 504 crosses above the 20-period SMA as indicated by the SMA child indicator 510.
    The first indicator ID is the ID of the latest price parent indicator 502 (ID 1). This represents a parent indicator.
    The first instance ID is the ID of the latest price child indicator 504 (ID 1). This represents the specific child instance of the latest price parent indicator 502.
    The second indicator ID is the ID of the SMA parent indicator 508 (ID 2). This represents a parent indicator.
    The second instance ID is the ID of the SMA child indicator 510 (ID 1). This represents the specific child instance of the SMA parent indicator 508.
    The output of the crosses above child comparator 516 (true or false), created by integrating the two specific child indicators, can then be used as an entry rule.

The crosses above child comparator 518 is formed as follows:
    A trading strategy involves buying Ethereum™ (ETH) when the price as indicated by the latest price child indicator 506 crosses above the 50-period SMA as indicated by the SMA child indicator 512.
    The first indicator ID is the ID of the latest price parent indicator 502 (ID 1). This represents a parent indicator.
    The first instance ID is the ID of the latest price child indicator 506 (ID 2). This represents the specific child instance of the latest price parent indicator 502.
    The second indicator ID is the ID of the SMA parent indicator 508 (ID 2). This represents a parent indicator.
    The second instance ID is the ID of the SMA child indicator 512 (ID 2). This represents the specific child instance of the SMA parent indicator 508.
    The output of the crosses above child comparator 516 (true or false) can then be used as an entry rule.

To define a trading bot, e.g., the trading bot 104 of FIG. 1, a combination of entry and exit rules may be configured using different comparators. The "parents" thus provide the base logic for each respective indicator, while the "children" (or "instances" in this example) define specific configurations of their respective parents. Accordingly, a child comparator is a specific combination of parent and child instance IDs. The logic, e.g., the logic contained in the parents, can be reused to generate new children.

Another (simplified) example is provided below to illustrate an entry rule and an exit rule:
Entry Rule:
    Comparator 1: "Crosses Above"
    Input 1: "Latest Price"
    Input 2: "20-period moving average"
Exit Rule:
    Comparator 2: "Crosses Below"
    Input 1: "Latest Price"
    Input 2: "50-period moving average"

In this way, at least in some cases, entry and exit rules that a trading bot is designed to implement can be encapsulated in a reusable or partially reusable component. The trading bot checks the comparator outputs (e.g., at every time step, such as every one minute) to decide when to trade. A comparator self-executing contract, e.g., a child comparator self-executing contract, thus encapsulates the logic for a specific entry or exit rule. This modular design allows the rules themselves to be improved or modified independently of the bot logic.

When an entry rule triggers, the trading bot may be marked as "in a trade," and the relevant details, such as entry price and time, may be recorded. When an exit rule triggers, the trading bot may be marked as "not in a trade." Performance data may be computed based on exit price and made available via the data feed, in some examples.

Figure 6:
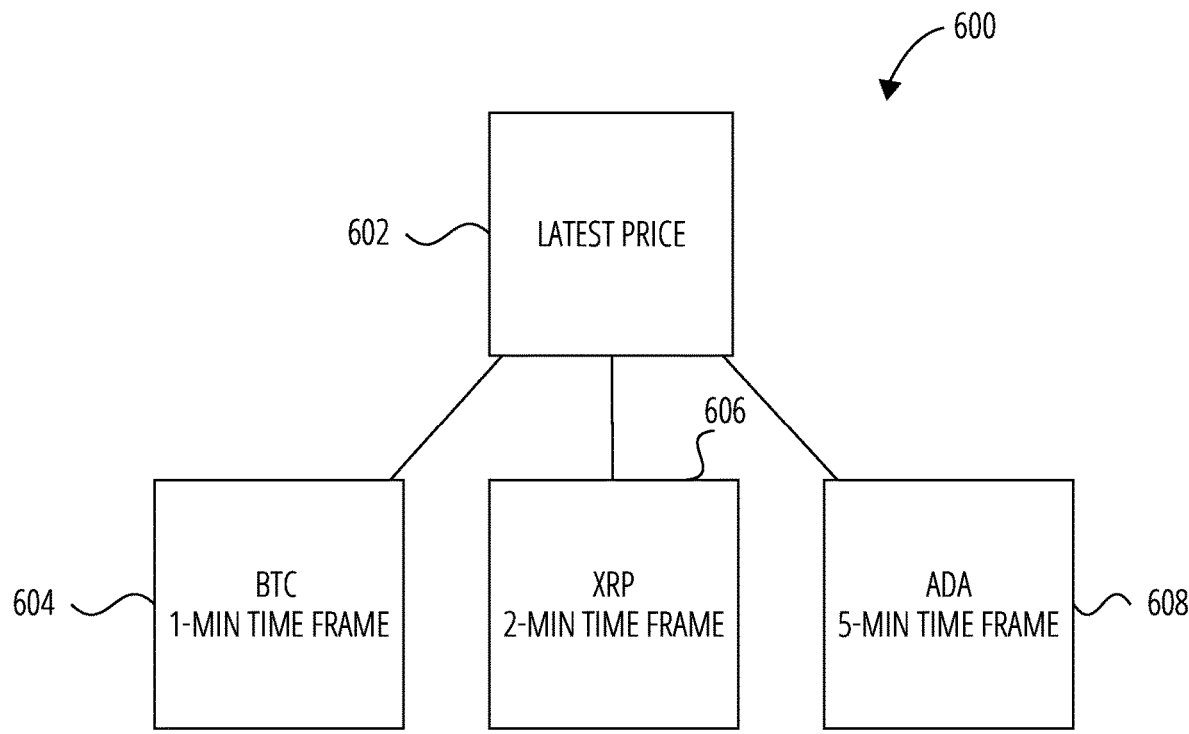
FIG. 6 is a block diagram illustrating a parent indicator and three child indicators associated with the parent indicator that may be used in an algorithmic trading system, according to some examples.

FIG. 6 is a diagram 600 illustrating a parent indicator and three child indicators that may be used in an algorithmic trading system, such as the algorithmic trading system 102 of FIG. 1, according to some examples. In FIG. 6, the parent indicator is a latest price parent indicator 602 and the child indicators are a latest price child indicator 604 that tracks BTC in a 1-minute time frame, a latest price child indicator 606 that tracks Ripple™ (XRP) in a 2-minute time frame, and a latest price child indicator 608 that tracks Cardano™ (ADA) in a 5-minute time frame.

The three child indicators 604, 606, 608, thus track different cryptocurrency asset prices with different timings. The child indicators 604, 606, 608 shown in FIG. 6 may be connected to comparators to implement trading rules.

Figure 7:
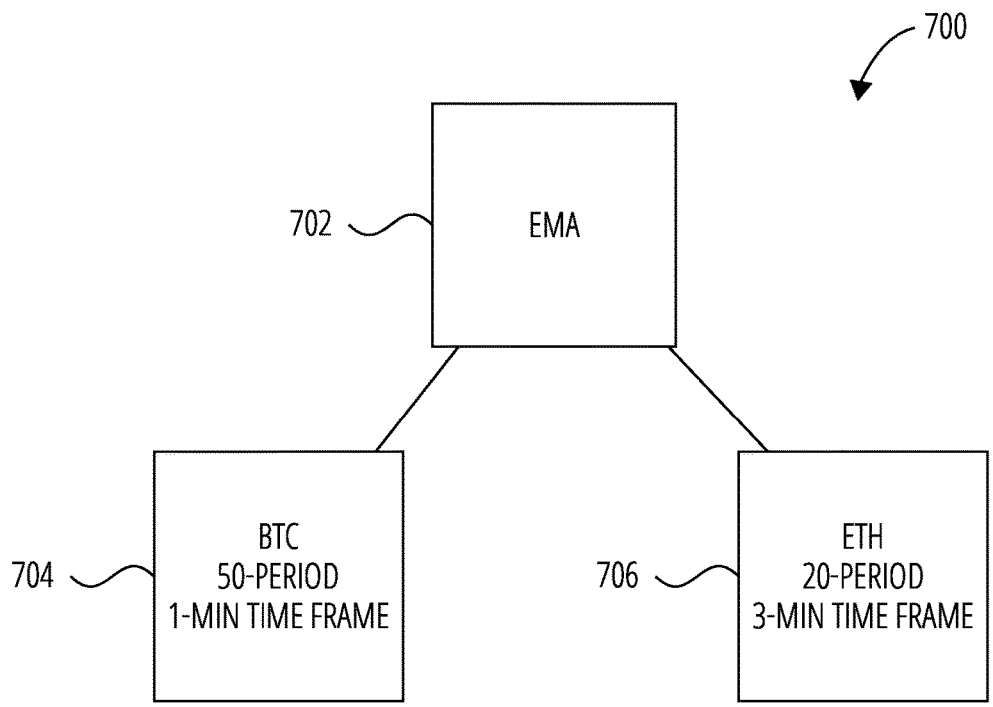
FIG. 7 is a block diagram illustrating a parent indicator and two child indicators associated with the parent indicator that may be used in an algorithmic trading system, according to some examples.

FIG. 7 is a diagram 700 illustrating a parent indicator and two child indicators that may be used in an algorithmic trading system, such as the algorithmic trading system 102 of FIG. 1, according to some examples. In FIG. 7, the parent indicator is an EMA parent indicator 702 and the child indicators are an EMA child indicator 704 that tracks BTC's 50-period EMA with a 1-minute time frame, and an EMA child indicator 706 that tracks ETH's 20-period EMA with a 3-minute time frame. The child indicators 704, 706 shown in FIG. 7 may be connected to comparators to implement trading rules.

Figure 8:
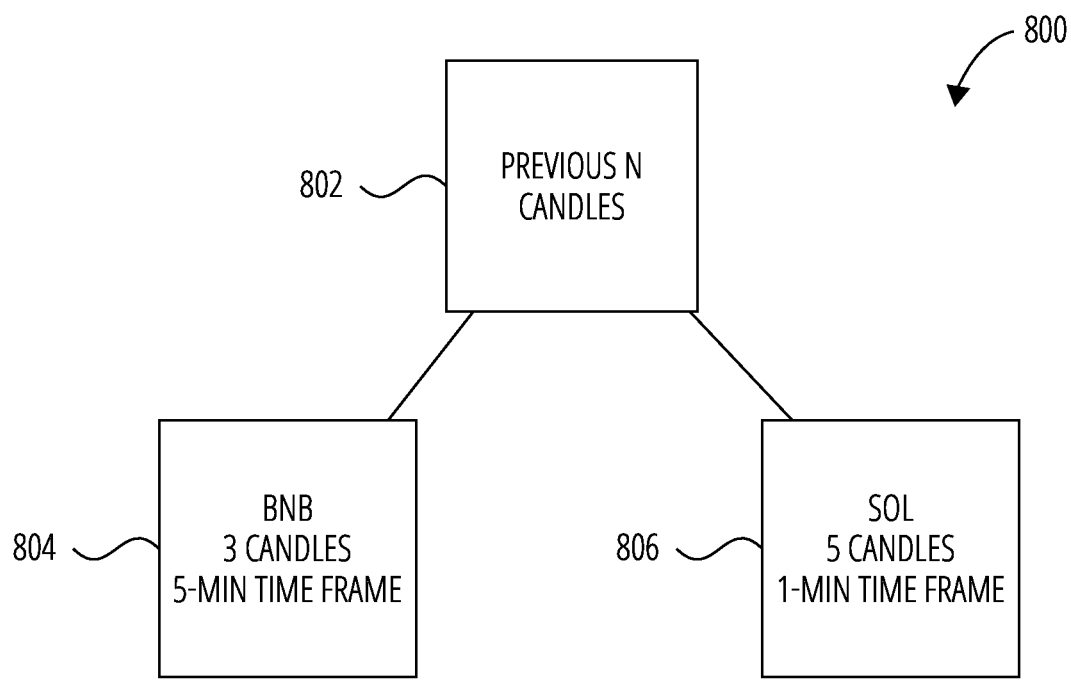
FIG. 8 is a block diagram illustrating a parent indicator and two child indicators associated with the parent indicator that may be used in an algorithmic trading system, according to some examples.

FIG. 8 is a diagram 800 illustrating a parent indicator and two child indicators that may be used in an algorithmic trading system, such as the algorithmic trading system 102 of FIG. 1, according to some examples. In FIG. 8, the parent indicator is a previous N candles parent indicator 802 (e.g., returning an array of closing prices from the previous N candlestick periods) and the child indicators are a previous N candles child indicator 804 and a previous N candles child indicator 806 that track different cryptocurrency assets with specified parameters, as shown in FIG. 8.

The child indicator 804 tracks Binance™ (BNB) closing prices of the previous 3 candlestick periods with 5-minute time frames, while the child indicator 806 tracks Solana™ (SOL) closing prices of the previous 5 candlestick periods with 1-minute time frames. The child indicators 804, 806 shown in FIG. 8 may be connected to comparators to implement trading rules.

Figure 9:
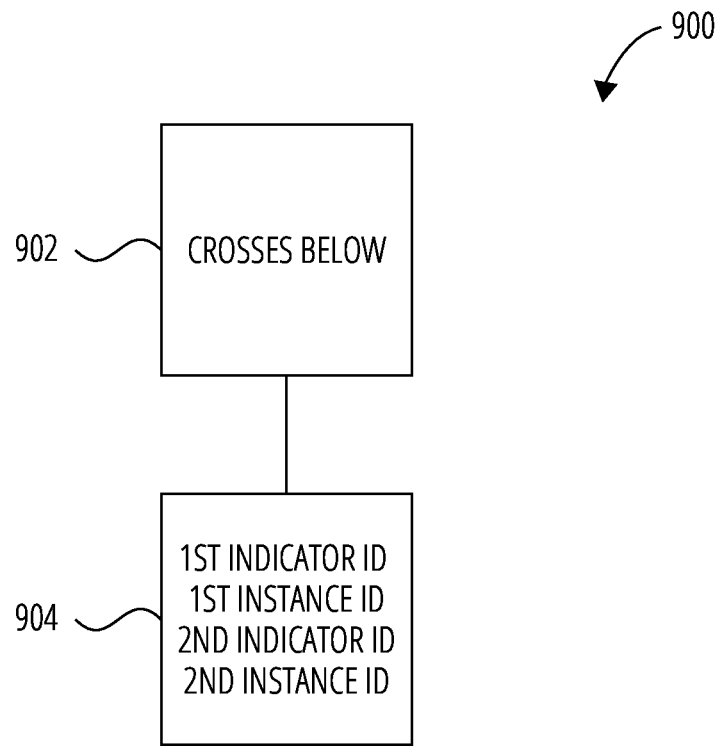
FIG. 9 is a block diagram illustrating a parent comparator and a child comparator associated with the parent comparator that may be used in an algorithmic trading system, according to some examples.

FIG. 9 is a diagram 900 illustrating a parent comparator and a child comparator that may be used in an algorithmic trading system, such as the algorithmic trading system 102 of FIG. 1, according to some examples. In FIG. 9, the parent comparator is a "crosses below" parent indicator 902 and its crosses below child indicator 904 integrates two "instances of indicators," or child indicators, e.g., selected from those shown in FIG. 5. In some examples, the crosses below child indicator 904 provides a unique combination of parameters that can be used to represent a specific "crosses below" trading rule.

Figure 10:
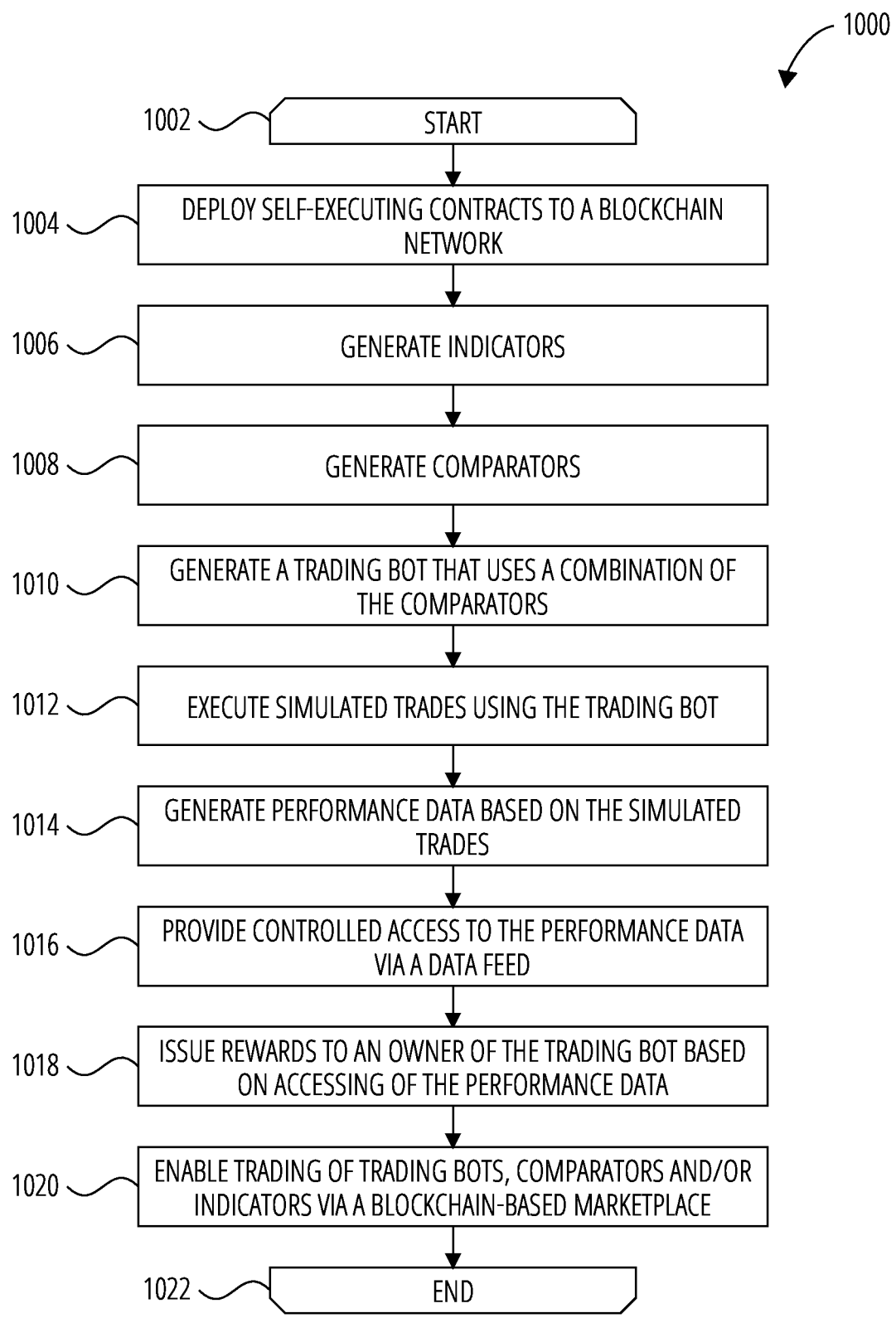
FIG. 10 is a flowchart illustrating a method suitable for providing an algorithmic trading system via a blockchain network, according to some examples.

FIG. 10 is a flowchart illustrating a method 1000 suitable for providing an algorithmic trading system on a blockchain network, according to some examples. By way of example and not limitation, aspects of the method 1000 may be performed using self-executing contracts, modules, components, systems, techniques, or devices shown in any of FIGS. 1-9. Accordingly, while reference may be made to some of these self-executing contracts, modules, components, systems, techniques, or devices below, it will be appreciated that at least some operations of FIG. 10 may also be performed using other self-executing contracts, modules, components, systems, techniques, or devices.

The method 1000 commences at opening loop element 1002, and proceeds to operation 1004, where a plurality of self-executing contracts, e.g., the self-executing contracts 302 of FIG. 3, are deployed to a blockchain network, e.g., the blockchain network 238 of FIG. 2. The self-executing contracts 302 can be used to implement an algorithmic trading system, such as the algorithmic trading system 102 of FIG. 1.

At operation 1006, the method 1000 includes generating indicators. For example, a plurality of parent indicators and associated child indicators may be generated and made available on the blockchain network 238 via the self-executing contracts (e.g., the indicator template contract 306, the components contract 308, the component instances factory contract 310, the components instances contract 312, and/or the components registry contract 314). Some indicators may be deployed by a system developer at the time of launching the algorithmic trading system, while others may be created and deployed by users, as described above.

At operation 1008, the method 1000 includes generating comparators. For example, a plurality of parent comparators and associated child comparators may be generated and made available on the blockchain network 238 via the self-executing contracts (e.g., the comparator template contract 304, the components contract 308, the component instances factory contract 310, the components instances contract 312, and/or the components registry contract 314).

Again, some comparators may be deployed by a system developer at the time of launching the algorithmic trading system, while others may be created and deployed by users, as described above. Child comparators may integrate one or multiple child indicators. For example, a child comparator may implement logic to determine if a price crosses above or below an indicator metric, or if an indicator metric reaches a threshold.

The method 1000 proceeds to operation 1010, where a user (e.g., the bot owner 126) or a system developer causes a trading bot (e.g., the trading bot 104) to be generated and deployed in the algorithmic trading system via the self-executing contracts (e.g., the trading bot registry contract 326, the trading bots contract 328, the trading bot factory contract 330, and/or the trading bot contract 332). The trading bot employs a combination of the comparators in the algorithmic trading system to define its trading rules.

In some examples, a user of the algorithmic trading system (e.g., the bot owner 126 of FIG. 1 or the user 208 of the FIG. 2) or a system developer may create a trading bot that is not publicly published, e.g., to a primary platform of the algorithmic trading system. In such a case, the trading bot may still be fully operational from a trading perspective, but does not include a linked data feed that is accessible to others, and its performance data may thus not be accessible to external requesting entities. Accordingly, in some examples, only trading bots that are published in this manner have linked data feeds. However, in other examples, all trading bots may have linked data feeds.

In some examples, the process of creating a trading bot may be split into multiple stages or transactions to address the stack limit relevant to self-executing contracts, e.g., in some cases, no more than 16 variables (including function parameters) may be on a stack at a given point in time. A non-limiting example of a five-stage process is included below:

Stage 1: Stage trading bot parameters. Bot parameters, such as name, time frame and/or assets are staged in the contract storage of the trading bot registry contract 326.

Stage 2: Deploy trading bot contract 332. A new trading bot is deployed using the staged parameters, e.g., via the trading bot factory contract 330.

Stage 3: Initialize trading bot. The staged parameters are initialized in the deployed contract storage.

Stage 4: Set rules. The rules, e.g., entry and exit rules defined by the bot creator, are set in the trading bot contract 332.

Stage 5: Mint NFT. An NFT representing the trading bot is minted and transferred to the bot creator (e.g., the bot owner 126 of FIG. 1).

Splitting the process across transactions not only addresses stack limits, but also enables validation of parameters before finally deploying contracts.

For example, a self-executing contract includes code for tracking a moving average. This self-executing contract is a parent indicator and can have its own unique NFT. However, another user could mint an NFT representing a child indicator derived from that parent indicator, e.g., "20-period moving average for BTC on 1-minute candles." The specific parameters for the child are therefore "20-period," "BTC" and "1-minute candles," while the child inherits moving average from its parent. The parent and child are thus uniquely identifiable.

As mentioned, while trading bots, comparators, and/or indicators can be implemented as self-executing contracts (that contain code to implement the relevant logic or rules), each unique trading bot, comparator, and/or indicator can also be minted as an NFT such that a particular "instance" or "deployment" of the contract can be identified, tracked, or traded. This may also prevent duplication in the algorithmic trading system, e.g., the system may track components to ensure that no two child indicators or child comparators are functionally identical, e.g., only one indicator for "20-period moving average for BTC on 1-minute candles" existing in the system, thereby improving overall efficiency of the system, and reducing computing resource load.

The method 1000 proceeds to operation 1012, where the trading bot executes simulated trades. As mentioned, the trading bot is continuously updated using a keeper. A non-limiting example of an algorithm for updating a trading bot is included below:

| Algorithm for updating a trading bot |
| --- |
| A. The keeper checks whether the bot can be updated. For example, the bot has an assigned time frame of one minute, in which case it can only be called once per minute.<br>    i. If false, exit early.<br>    ii. If true, go to B.<br>B. Obtain external asset data, e.g., the high price, low price, and latest price for the bot's asset's latest candlestick.<br>C. Increment the number of updates, e.g., in a global state variable.<br>D. Set the "last updated timestamp" to the current time.<br>E. If the bot is not in a trade:<br>    If all entry rules are met:<br>        Set bot's "in trade" state variable to be true.<br>        Set "entry index" to the number of updates.<br>        Set bot's entry price to the latest price.<br>        Send a trade to the bot's data feed with "latest price" as the execution price.<br>    Else:<br>        Exit early.<br>    Else:<br>    If profit target is met:<br>        Set bot's "in trade" to be false and send a trade to data feed with (entry price * (profit target + 1)) as execution price.<br>    Else if stop loss is met:<br>        Set bot's "in trade" to false and send a trade to data feed with (entry price * (1 − stop loss)) as execution price.<br>    Else if maximum trade duration is met or exit rules are met:<br>        Set bot's "in trade" to false, and send a trade to data feed with "latest price" as the execution price. |

The trading bot or the data feed generates performance data based on the simulated trades at operation 1014. For example, the data feed may track the latest price of the relevant asset as the performance data, or may track an overall portfolio value or ROI of the trading bot as the performance data.

At operation 1016, the data feed contract 336 provides controlled access to the performance data, e.g., by requiring a data usage payment or address validation, as described above. For example, a requesting entity that is authorized or validated may track the trading bot (e.g., its value or price) by accessing the performance data in the data feed contract 336. The method 1000 may include transmitting a message indicative of the performance data. For example, the interface system 226 of FIG. 2 may cause presentation of such a message to the user 208 on the user device 206.

The method 1000 of FIG. 10 further includes issuing rewards to an owner of the trading bot (e.g., the bot owner 126 of FIG. 1) based on accessing of the performance data, e.g., by the external protocol 122 of FIG. 1, at operation 1018.

In some examples, and as shown in FIG. 10, the method 1000 includes enabling trading of trading bots, comparators and/or indicators via a blockchain-based marketplace at operation 1020. The marketplace contract 316 of FIG. 3 and/or the marketplace system 228 of FIG. 2 may be used for this purpose, e.g., together with the algorithmic trading app that facilitates user trading. The algorithmic trading system may thus include a marketplace that enables users to trade the indicators (parents or children), comparators (components or children), or trading bots. In some examples, the algorithmic trading system 102 may have an associated governance token that is used as payment in such trades.

Listings in the marketplace contract 316 may be represented as structs stored in a mapping indexed by strictly increasing IDs. Each listing may contain one or more of: seller address, a flag indicating if the listing is active, contract type, component ID, token ID (this may, for example, be a component ID for a parent, an instance ID for a child, and a bot ID for a trading bot), or price, e.g., denominated in the governance token. As mentioned, in some cases, listings are never deleted, and instead only marked as deleted in the state mapping. This may ensure that the index IDs always increment, allowing efficient O(1) updates.

In some examples, while listed for sale, NFTs are held by the marketplace contract 316. This may prevent sellers from modifying NFTs during this time. Any usage fees collected by an NFT while listed may accrue in escrow, and are sent to the seller when the listing ends. The method 1000 of FIG. 10 concludes at closing loop element 1022.

Figure 11:
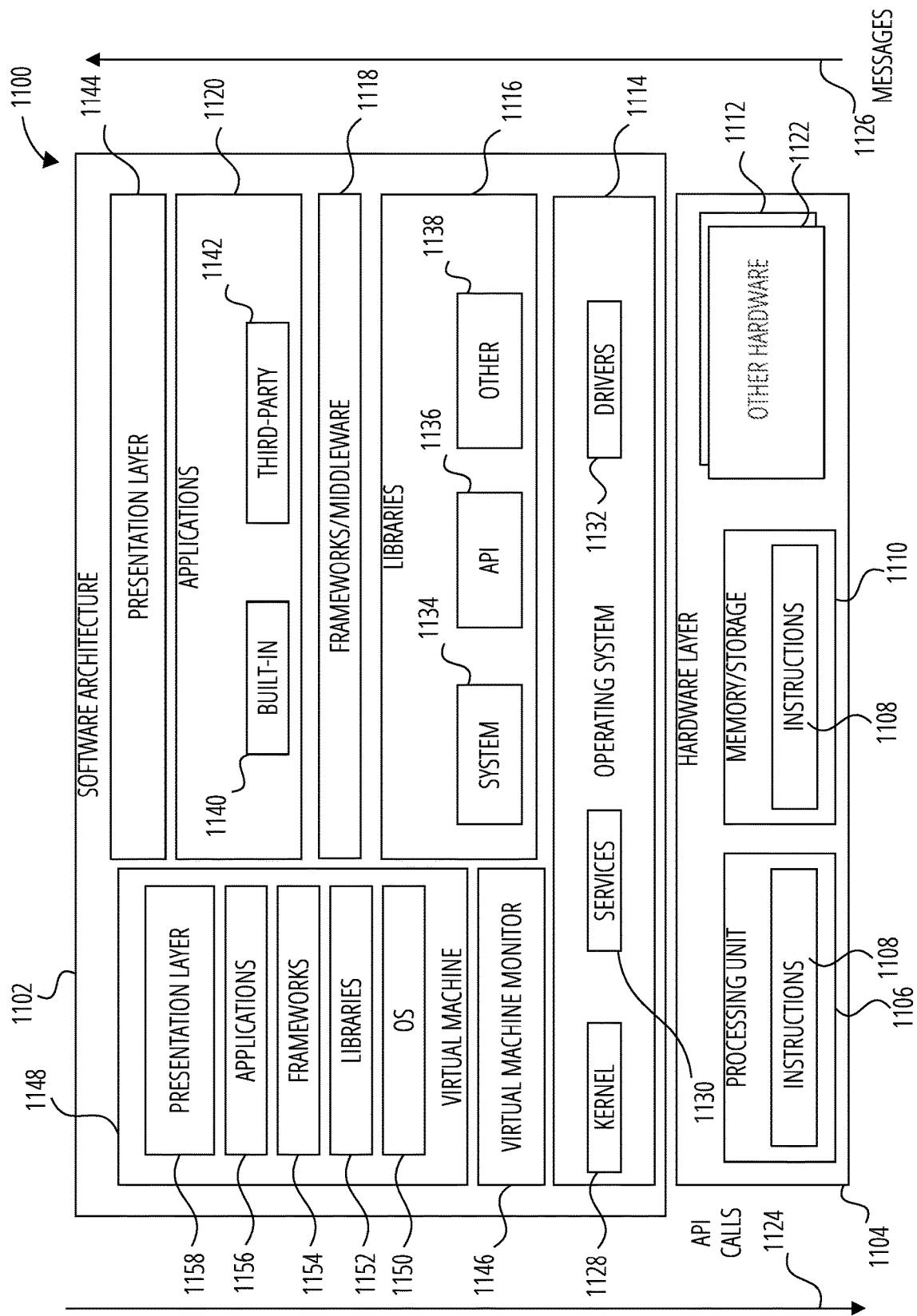
FIG. 11 is a block diagram showing a software architecture for a computing device, according to some examples.

FIG. 11 is a block diagram 1100 showing a software architecture 1102 for a computing device, according to some examples. The software architecture 1102 may be used in conjunction with various hardware architectures, for example, as described herein. FIG. 11 is merely a non-limiting illustration of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 and other hardware 1122 which represent any other hardware of the hardware layer 1104, such as the other hardware illustrated as part of the software architecture 1102.

In the architecture of FIG. 11, the software architecture 1102 may be conceptualized as a stack of layers where each layer provides particular functionality. For example, the software architecture 1102 may include layers such as an operating system 1114, libraries 1116, frameworks/middleware layer 1118, applications 1120, and presentation layer 1144. Operationally, the applications 1120 or other components within the layers may invoke API calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1116 may provide a common infrastructure that may be utilized by the applications 1120 or other components or layers. The libraries 1116 typically provide functionality that allows other software modules to perform tasks in an easier fashion than to interface directly with the underlying operating system 1114 functionality (e.g., kernel 1128, services 1130 or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware layer 1118 may provide a higher-level common infrastructure that may be utilized by the applications 1120 or other software components/modules. For example, the frameworks/middleware layer 1118 may provide various graphic user interface (GUI) functions, high-level resource management, high-level location services, and so forth. The frameworks/middleware layer 1118 may provide a broad spectrum of other APIs that may be utilized by the applications 1120 or other software components/modules, some of which may be specific to a particular operating system or platform.

The applications 1120 include built-in applications 1140 or third-party applications 1142. Examples of representative built-in applications 1140 may include, but are not limited to, a contacts application, a browser application, a book reader application, a location application, a media application, a messaging application, or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 or drivers 1132), libraries (e.g., system libraries 1134, API libraries 1136, and other libraries 1138), and frameworks/middleware layer 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (e.g., operating system 1114). A software architecture executes within the virtual machine 1148 such as an operating system 1150, libraries 1152, frameworks/middleware 1154, applications 1156 or presentation layer 1158. These layers of software architecture executing within the virtual machine 1148 can be the same as corresponding layers previously described or may be different.

Certain examples are described herein as including logic or a number of components, modules, or mechanisms. Components or modules may constitute either software components (e.g., code embodied (1) on a non-transitory machine-readable medium or (2) in a transmission signal) or hardware-implemented components. A hardware-implemented component or hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented component or module that operates to perform certain operations as described herein.

In various examples, a hardware-implemented component may be implemented mechanically or electronically. For example, a hardware-implemented component may comprise dedicated circuitry or logic that is permanently configured (e.g., as a special-purpose processor, such as a field programmable gate array (FPGA) or an application-specific integrated circuit (ASIC)) to perform certain operations. A hardware-implemented component may also comprise programmable logic or circuitry (e.g., as encompassed within a general-purpose processor or another programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) may be driven by cost and time considerations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules are configured or instantiated at different times, communications between such hardware-implemented modules may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output. Hardware-implemented modules/components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a component, module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 12:
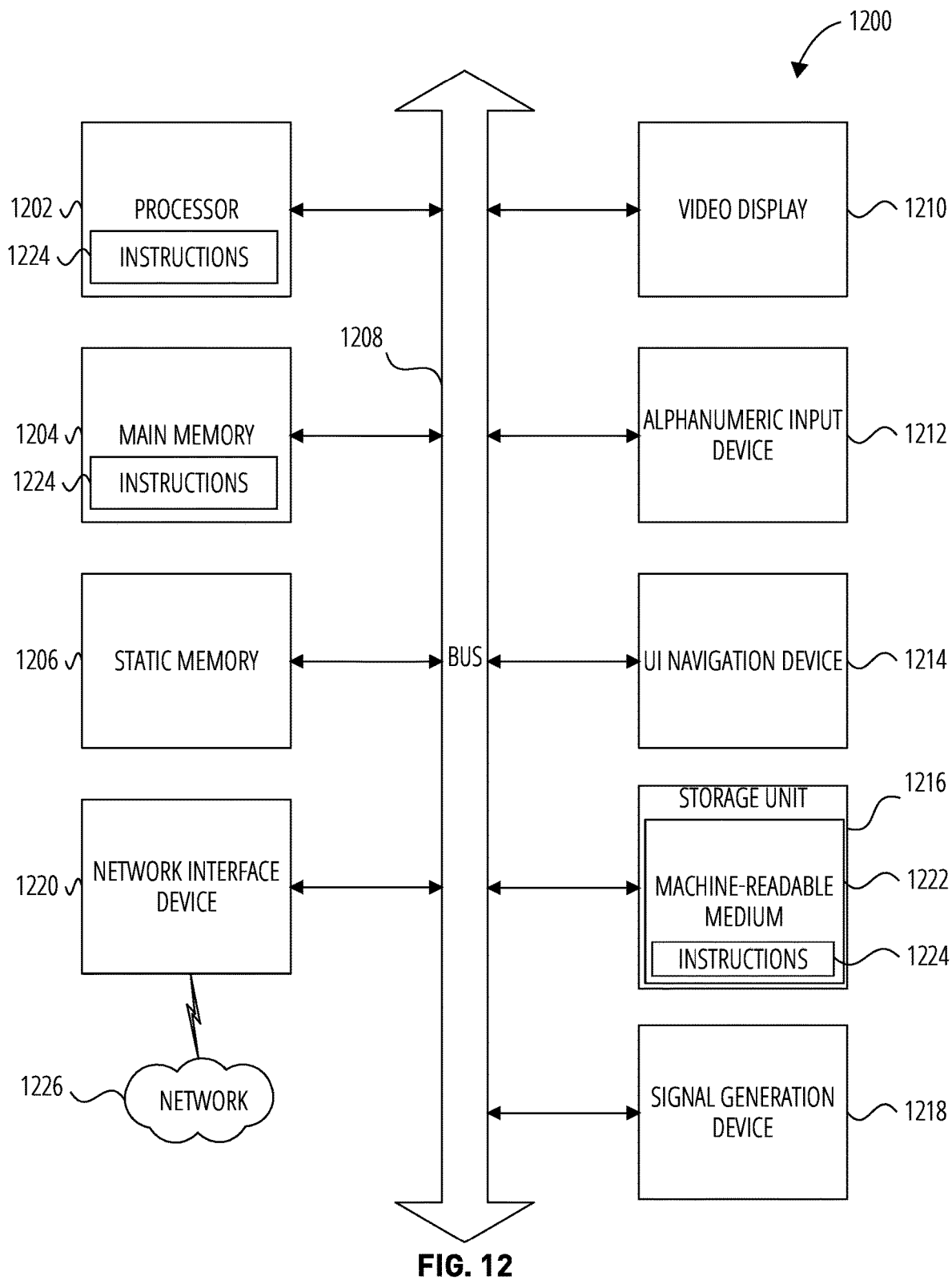
FIG. 12 is a block diagram of a machine in the form of a computer system, according to some examples, within which instructions may be executed for causing the machine to perform any one or more of the methodologies discussed herein.

FIG. 12 is a block diagram of a machine in the example form of a computer system 1200 within which instructions 1224 may be executed for causing the machine to perform one or more of the methodologies discussed herein. In alternative examples, the machine operates as a standalone computing device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines (e.g., computing devices) that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface navigation (or cursor control) device 1214 (e.g., a mouse), a storage unit 1216, a signal generation device 1218 (e.g., a speaker), and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 or within the processor 1202 during execution thereof by the computer system 1200, with the main memory 1204 and the processor 1202 also each constituting a machine-readable medium 1222.

While the machine-readable medium 1222 is shown in accordance with some examples to be a single medium, the term "machine-readable medium" may include a single medium or multiple media (e.g., a centralized or distributed database, or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of a machine-readable medium 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1224 may further be transmitted or received over a communications network 1226 using a transmission medium. The instructions 1224 may be transmitted using the network interface device 1220 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1224 for execution by the machine, and includes digital or analog communications signals or other intangible media to facilitate communication of such software.

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a system comprising: at least one memory component that stores instructions; and one or more processors configured by the instructions to perform operations comprising causing one or more self-executing contracts deployed on a blockchain network to: provide at least one indicator, wherein each indicator processes external asset data to obtain indicator values; provide at least one comparator, wherein each comparator processes one or more of the indicator values to obtain output indicating whether a comparator condition is met; generate a trading bot that implements predetermined trading rules by using the output of the at least one comparator; and execute, by the trading bot, simulated trades according to the predetermined trading rules.

In Example 2, the subject matter of Example 1 includes, wherein the at least one indicator comprises a child indicator, and the providing of the at least one indicator comprises: instantiating the child indicator based on a parent indicator on the blockchain network, the parent indicator being used to instantiate a plurality of different child indicators on the blockchain network.

In Example 3, the subject matter of any of Examples 1-2 includes, wherein the at least one comparator comprises a child comparator, and the providing of the at least one comparator comprises: instantiating the child comparator based on a parent comparator on the blockchain network, the child comparator integrating at least a first indicator and a second indicator, and the parent comparator being used to instantiate a plurality of different child comparators on the blockchain network.

In Example 4, the subject matter of Example 3 includes, wherein the child comparator analyzes the indicator values of the first indicator and the second indicator respectively to determine whether the comparator condition is met.

In Example 5, the subject matter of any of Examples 3-4 includes, wherein the first indicator is a first child indicator and the second indicator is a second child indicator, and the child comparator includes identifying information that comprises an identifier of the first child indicator, an identifier of a parent indicator of the first child indicator, an identifier of the second child indicator, and an identifier of a parent indicator of the second child indicator.

In Example 6, the subject matter of any of Examples 1-5 includes, wherein the simulated trades comprise trading of a virtual asset, and a price of the virtual asset is linked to a price of a real-world asset provided by the external asset data.

In Example 7, the subject matter of Example 6 includes, wherein the real-world asset is a cryptocurrency asset.

In Example 8, the subject matter of any of Examples 1-7 includes, the operations further comprising causing the one or more self-executing contracts deployed on the blockchain network to: obtain the external asset data via a blockchain oracle.

In Example 9, the subject matter of any of Examples 1-8 includes, wherein execution of each simulated trade comprises: determining a current indicator value of each indicator; detecting, based on the current indicator value of each indicator, that each comparator condition is met; and responsive to detecting that each comparator condition is met, executing the simulated trade according to the predetermined trading rules.

In Example 10, the subject matter of any of Examples 1-9 includes, wherein the at least one comparator comprises a set of comparators, and the predetermined trading rules comprise entry and exit rules implemented by combining the comparators in the set of comparators.

In Example 11, the subject matter of any of Examples 1-10 includes, the operations further comprising causing the one or more self-executing contracts deployed on the blockchain network to: generate performance data based on the simulated trades executed by the trading bot; and output, onto the blockchain network, a data feed comprising at least some of the performance data of the trading bot.

In Example 12, the subject matter of Example 11 includes, the operations further comprising causing the one or more self-executing contracts deployed on the blockchain network to: provide controlled access to the data feed to enable a requesting entity to utilize the performance data.

In Example 13, the subject matter of Example 12 includes, wherein the requesting entity utilizes the performance data in a synthetic asset protocol.

In Example 14, the subject matter of any of Examples 12-13 includes, wherein the requesting entity comprises an external self-executing contract.

In Example 15, the subject matter of any of Examples 1-14 includes, the operations further comprising causing the one or more self-executing contracts deployed on the blockchain network to: provide a marketplace for trading ownership rights to at least one of trading bots, indicators, or comparators, the marketplace comprising a plurality of listings accessible via the blockchain network.

In Example 16, the subject matter of Example 15 includes, wherein the ownership rights are represented by non-fungible tokens (NFTs).

In Example 17, the subject matter of any of Examples 15-16 includes, wherein the generating of the trading bot comprises: generating an NFT representing the trading bot; and assigning the NFT to an address associated with a user.

In Example 18, the subject matter of any of Examples 1-17 includes, wherein the operations further comprise: deploying the one or more self-executing contracts to the blockchain network.

Example 19 is a method comprising causing one or more self-executing contracts deployed on a blockchain network to: provide at least one indicator, wherein each indicator processes external asset data to obtain indicator values; provide at least one comparator, wherein each comparator processes one or more of the indicator values to obtain output indicating whether a comparator condition is met; generate a trading bot that implements predetermined trading rules by using the output of the at least one comparator; and execute, by the trading bot, simulated trades according to the predetermined trading rules.

Example 20 is a non-transitory computer-readable medium that stores instructions that, when executed by one or more processors, cause the one or more processors to perform operations comprising causing one or more self-executing contracts deployed on a blockchain network to: provide at least one indicator, wherein each indicator processes external asset data to obtain indicator values; provide at least one comparator, wherein each comparator processes one or more of the indicator values to obtain output indicating whether a comparator condition is met; generate a trading bot that implements predetermined trading rules by using the output of the at least one comparator; and execute, by the trading bot, simulated trades according to the predetermined trading rules.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually, or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:
   at least one memory component that stores instructions; and
   one or more processors configured by the instructions to perform operations comprising causing one or more self-executing contracts deployed on a blockchain network to:
      instantiate a plurality of child indicators, wherein each child indicator processes external asset data to obtain indicator values, and each child indicator is instantiated, based on a parent indicator on the blockchain network, using a unique combination of indicator parameters;
      instantiate a plurality of child comparators, wherein each child comparator integrates a combination of the plurality of child indicators and processes inputs comprising one or more of the indicator values from the combination of the plurality of child indicators to obtain output indicating whether a comparator condition is met, and each child comparator is instantiated, based on a parent comparator on the blockchain network, using a unique set of identifiers associated with the combination of the plurality of child indicators;
      store, on the blockchain network, a data structure identifying a combination of the plurality of child comparators defining a trading bot
      execute, by the trading bot and on the blockchain network, simulated trades according to predetermined trading rules that are based on the combination of the plurality of child comparators in the data structure and additional bot parameters; and
      automatically update, by a keeper network on the blockchain network, the plurality of child indicators, the plurality of child comparators, and the trading bot, wherein the keeper network comprises dedicated keepers to access timing parameters of and periodically update respective ones of the plurality of child indicators, the plurality of child comparators, and the trading bot on the blockchain network, and wherein the keeper network is controlled by one or more off-chain scripts.

2. The system of claim 1, wherein
   each parent indicator is used to instantiate a plurality of different child indicators on the blockchain network.

3. The system of claim 1, wherein
   each parent comparator being is used to instantiate a plurality of different child comparators on the blockchain network.

4. The system of claim 1, wherein the combination of the plurality of child indicators comprises a first child indicator and a second child indicator, and each child comparator analyzes the indicator values of the first child indicator and the second child indicator associated with the child comparator respectively to determine whether the comparator condition is met.

5. The system of claim 1, wherein the unique set of identifiers comprises an identifier of a first child indicator, an identifier of the parent indicator of the first child indicator, an identifier of a second child indicator, and an identifier of the parent indicator of the second child indicator.

6. The system of claim 1, wherein the simulated trades comprise trading of a virtual asset, and a price of the virtual asset is linked to a price of a real-world asset provided by the external asset data.

7. The system of claim 6, wherein the real-world asset is a cryptocurrency asset.

8. The system of claim 1, the operations further comprising causing the one or more self-executing contracts deployed on the blockchain network to:
obtain the external asset data via a blockchain oracle.

9. The system of claim 1, wherein execution of each simulated trade comprises:
determining a current indicator value of each child indicator;
detecting, based on the current indicator value of each child indicator, that each comparator condition is met; and
responsive to detecting that each comparator condition is met, executing the simulated trade according to the predetermined trading rules.

10. The system of claim 1, wherein the predetermined trading rules comprise entry and exit rules implemented by the combination of the plurality of child comparators.

11. The system of claim 1, the operations further comprising causing the one or more self-executing contracts deployed on the blockchain network to:
generate performance data based on the simulated trades executed by the trading bot; and
output, onto the blockchain network, a data feed comprising at least some of the performance data of the trading bot.

12. The system of claim 11, the operations further comprising causing the one or more self-executing contracts deployed on the blockchain network to:
provide controlled access to the data feed to enable a requesting entity to utilize the performance data.

13. The system of claim 12, wherein the requesting entity utilizes the performance data in a synthetic asset protocol.

14. The system of claim 12, wherein the requesting entity comprises an external self-executing contract.

15. The system of claim 1, the operations further comprising causing the one or more self-executing contracts deployed on the blockchain network to:
provide a marketplace for trading ownership rights to at least one of trading bots, indicators, or comparators, the marketplace comprising a plurality of listings accessible via the blockchain network.

16. The system of claim 15, wherein the ownership rights are represented by non-fungible tokens (NFTs).

17. The system of claim 15, the operations further comprising:
generating an NFT representing the trading bot; and
assigning the NFT to an address associated with a user.

18. The system of claim 1, wherein the operations further comprise:
deploying the one or more self-executing contracts to the blockchain network.

19. A method comprising causing one or more self-executing contracts deployed on a blockchain network to:
instantiate a plurality of child indicators, wherein each child indicator processes external asset data to obtain indicator values, and each child indicator is instantiated, based on a parent indicator on the blockchain network, using a unique combination of indicator parameters;
instantiate a plurality of child comparators, wherein each child comparator integrates a combination of the plurality of child indicators and processes inputs comprising the indicator values from the combination of the plurality of child indicators to obtain output indicating whether a comparator condition is met, and each child comparator is instantiated, based on a parent comparator on the blockchain network, using a unique set of identifiers associated with the combination of the plurality of child indicators;
store, on the blockchain network, a data structure identifying a combination of the plurality of child comparators defining a trading bot
execute, by the trading bot and on the blockchain network, simulated trades according to predetermined trading rules that are based on the combination of the plurality of child comparators in the data structure and additional bot parameters; and
automatically update, by a keeper network on the blockchain network, the plurality of child indicators, the plurality of child comparators, and the trading bot, wherein the keeper network comprises dedicated keepers to access timing parameters of and periodically update respective ones of the plurality of child indicators, the plurality of child comparators, and the trading bot on the blockchain network, and wherein the keeper network is controlled by one or more off-chain scripts.

20. A non-transitory computer-readable medium that stores instructions that, when executed by one or more processors, cause the one or more processors to perform operations comprising causing one or more self-executing contracts deployed on a blockchain network to:
instantiate a plurality of child indicators, wherein each child indicator processes external asset data to obtain indicator values, and each child indicator is instantiated, based on a parent indicator on the blockchain network, using a unique combination of indicator parameters;
instantiate a plurality of child comparators, wherein each child comparator integrates a combination of the plurality of child indicators and processes inputs comprising the indicator values from the combination of the plurality of child indicators to obtain output indicating whether a comparator condition is met, and each child comparator is instantiated, based on a parent comparator on the blockchain network, using a unique set of identifiers associated with the combination of the plurality of child indicators;
store, on the blockchain network, a data structure identifying a combination of the plurality of child comparators defining a trading bot
execute, by the trading bot and on the blockchain network, simulated trades according to predetermined trading rules that are based on the combination of the plurality of child comparators in the data structure and additional bot parameters; and automatically update, by a keeper network on the blockchain network, the plurality of child indicators, the plurality of child comparators, and the trading bot, wherein the keeper network comprises dedicated keepers to access timing parameters of and periodically update respective ones of the plurality of child indicators, the plurality of child comparators, and the trading bot on the blockchain network, and wherein the keeper network is controlled by one or more off-chain scripts.

\* \* \* \* \*